United States Patent [19]

Nakayama et al.

[11] Patent Number: 5,280,583
[45] Date of Patent: Jan. 18, 1994

[54] SYSTEM AND METHOD FOR PERFORMING INTERLOCUTION AT A PLURALITY OF TERMINALS CONNECTED TO COMMUNICATION NETWORK

[75] Inventors: Yoshiyuki Nakayama, Yokohama; Kenjiro Mori, Machida; Kazuo Takaragi, Ebina; Singi Domen, Fujisawa, all of Japan

[73] Assignee: Hitachi, Ltd., Tokyo, Japan

[21] Appl. No.: 938,593

[22] Filed: Sep. 3, 1992

Related U.S. Application Data

[63] Continuation of Ser. No. 350,850, May 12, 1989, abandoned.

[30] Foreign Application Priority Data

May 13, 1988 [JP] Japan .................... 63-114636

[51] Int. Cl.$^5$ .................... G06F 13/14; G06F 3/14
[52] U.S. Cl. .................... 395/200; 395/153; 395/157
[58] Field of Search ............ 395/200, 153, 157, 158, 395/159

[56] References Cited

U.S. PATENT DOCUMENTS

| | | | |
|---|---|---|---|
| 3,618,035 | 11/1971 | Simms | 364/200 |
| 4,414,621 | 11/1983 | Bown et al. | 364/200 |
| 4,479,195 | 10/1984 | Herr et al. | 369/900 |
| 4,653,020 | 3/1987 | Cheselka et al. | 395/157 |
| 4,823,108 | 4/1989 | Pope | 395/157 X |
| 4,974,173 | 11/1990 | Stefik et al. | 395/157 |
| 5,008,853 | 4/1991 | Bly et al. | 395/153 |
| 5,107,443 | 4/1992 | Smith et al. | 395/158 |
| 5,159,669 | 10/1992 | Trigg et al. | 395/159 |

OTHER PUBLICATIONS

Seybold, Jonathan "Xerox's Star", In the Seybold Report, Media, Pa.: Seybold Publications, vol. 10, No. 16, 1981.

Primary Examiner—Gareth D. Shaw
Assistant Examiner—Dennis M. Butler
Attorney, Agent, or Firm—Antonelli, Terry, Stout & Kraus

[57] ABSTRACT

A plurality of work stations each imparted with a multi-window control function are interconnected through an integrated service digital network (ISDN), wherein control communication route is established among a plurality of stations between which interlocutory communication are to be performed. The work stations transfer control commands by way of the control communication route in accordance with operation by users under the control of an interlocution control program to thereby establish or disconnect a logical communication route between designated application programs of the work stations. So long as the logical communication route is established, the application programs can execute data processing in cooperation with each other. In that case, identical change of display in the windows corresponding to the application programs, respectively, takes place in the work stations. User can perform conference or document edition processing by designating the position of data of concern by a pointing object while conducting conversation by using a telephone set installed at the work station.

9 Claims, 24 Drawing Sheets

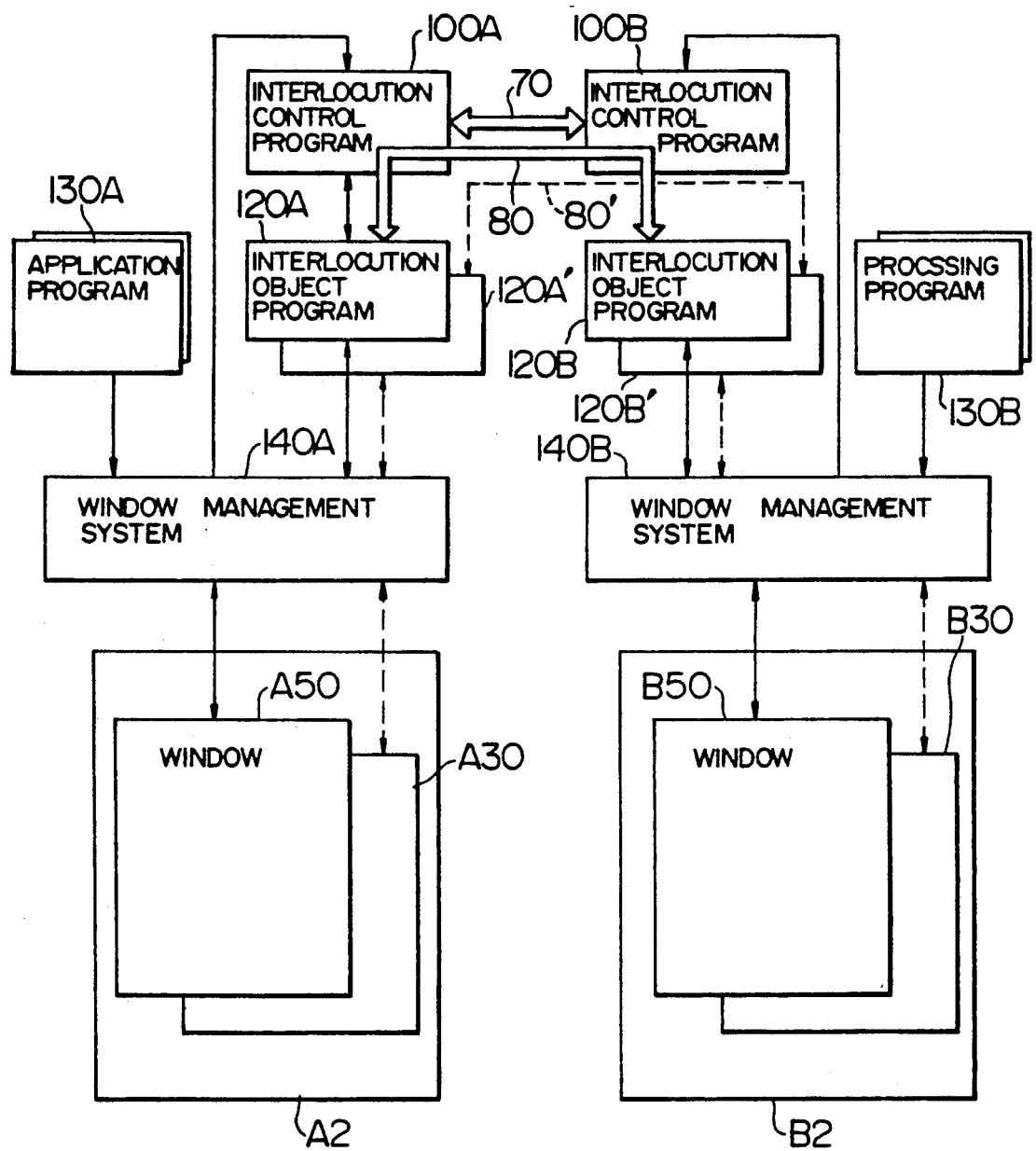

WORK STATION

FIG. 10A
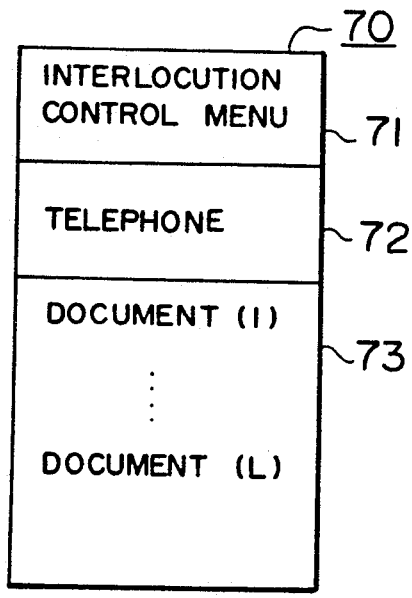
FIG. 10B
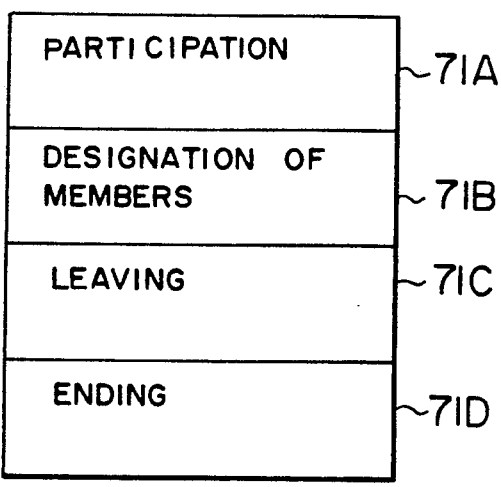
FIG. 10C
FIG. 10D
| | |
|---|---|
| 73A~ DISTRIBUTION OF DOCUMENT | END OF PO SESSION ~73H |
| 73B~ JOINT USE | STOP OF INTERLOCUTION ~73J |
| 73C~ STOP OF JOINT USE | RESTART OF INTERLOCUTION ~73K |
| 73D~ WITHDRAWAL OF DOCUMENT | JOINT USE OF DATA ~73L |
| 73E~ PREPARATION OF POINTING OBJECT | INDIVIDUAL USE ~73M |
| 73F~ DELETE OF POINTING OBJECT | AUTHENTICATION ~73N |
| 73G~ START OF PO SESSION | |

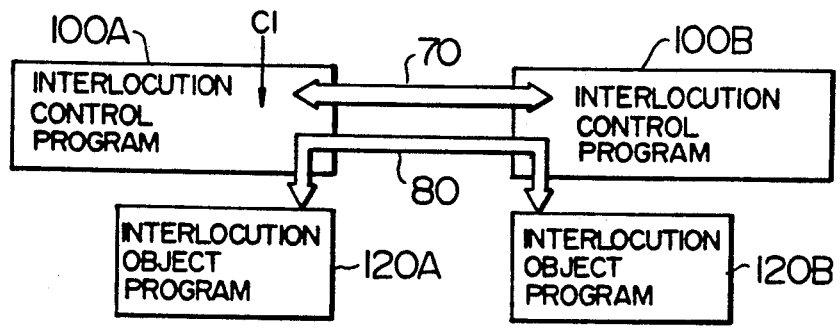
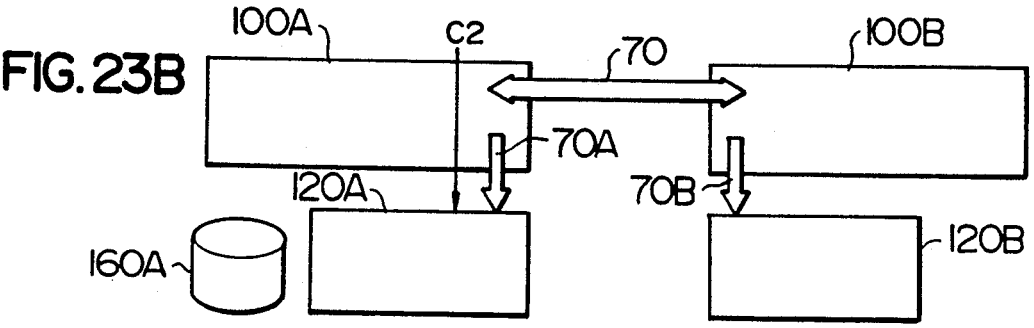
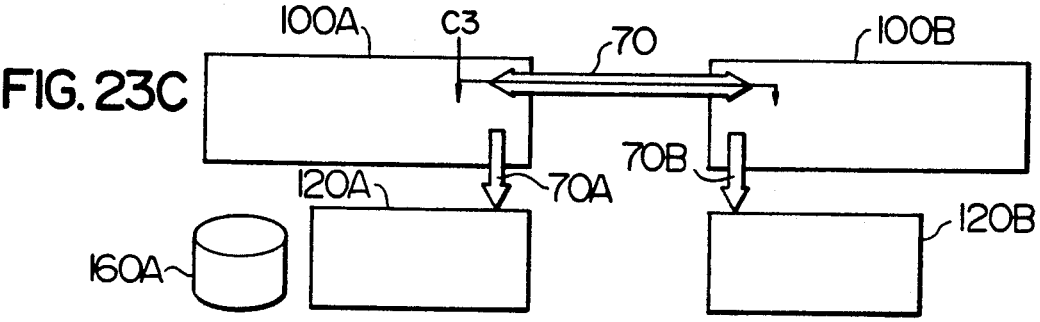
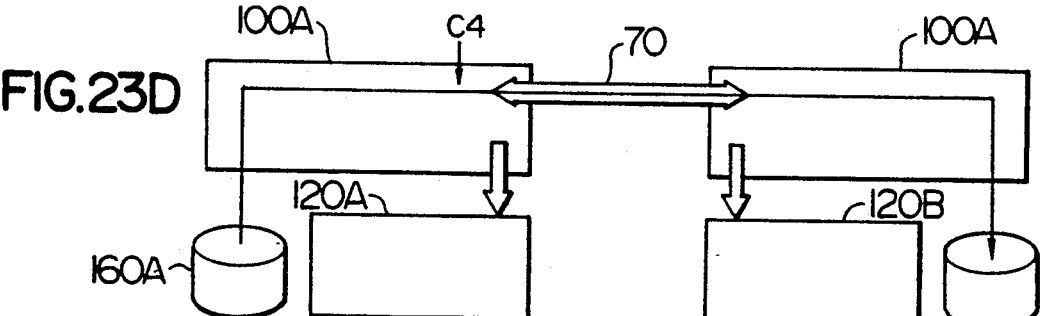
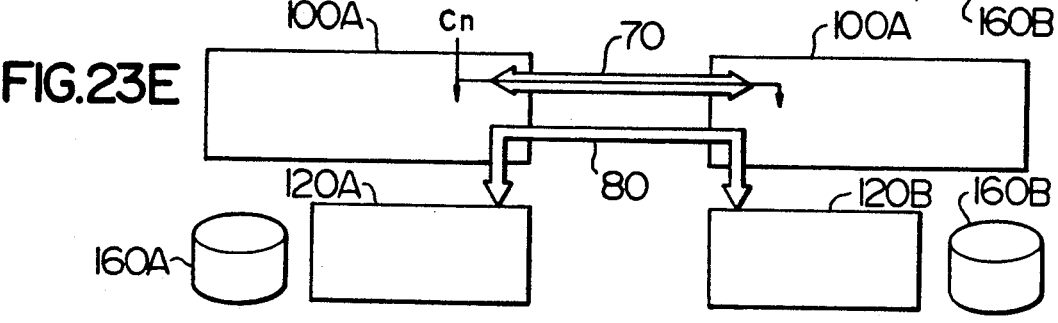

SYSTEM AND METHOD FOR PERFORMING INTERLOCUTION AT A PLURALITY OF TERMINALS CONNECTED TO COMMUNICATION NETWORK

This application is an application of Ser. No. 350,850, filed May 12, 1989, now abandoned.

BACKGROUND OF THE INVENTION

1. Field of the Invention

The present invention relates in general to a joint information processing system. More particularly, the invention is concerned with an electronic interlocution system in which a plurality of terminal apparatuses (also referred to simply as terminals) are interconnected through communication channels and in which data communication is carried out between or among the terminals to perform information processing jointly in cooperation with one another while the users of the terminals perform voice interlocution through telephone sets.

2. Description of the Related Art

In connection with a prior art data processing system or terminal apparatus of the type which has a data processing capability, an information processing program which has excellent interaction characteristics and is capable of outputting data which is easy to understand visually was at one time premised on the dedicated use of the program for the individual. A computer system using such program is described in detail in Seybold, Jonathon, "Xerox's 'Star'", in the Seybold Report Media, PA: Seybold Publications, Vol. 10, No. 16, (1981). However, this computer system is not equipped with any function which allows a plurality of users to make access simultaneously to the same data constituting a document, table and the like and which can reflect the results of the processing as performed onto a display on a real time basis. Although electronic mail is described in the publication cited above as one function of the system which allows the same data to be utilized by a plurality of users, electronic mail is a system in which a plurality of users cannot make access to the same document or the like simultaneously but only at different times.

On the other hand, in a communication between persons at remote locations, the telephone has been made use of among others. The telephone system is advantageous in that reactions of interlocutors can be transmitted straightforwardly on a real time basis and in that voice information is used which is very easy to understand. However, the inability to handle other than voice information in such a system presents a problem. Experience shows that even a fact which can be readily understood through the medium of a simple picture is difficult to understand when it is to be elucidated through verbalization. In other words, if a memorandum or document can be made use of in the course of conversation a mutual understanding of the information being discussed could be promoted significantly.

From JP-A-62-53084, such a system is known in which two terminals each equipped with a telephone set are interconnected through a communication channel, wherein the same images are displayed on the display devices of both terminals, respectively, together with a cursor inputted in one terminal and a cursor inputted from the counterpart or partner terminal to thereby allow a conference to be conducted by viewing the displays.

When each of the terminals is provided with a multi-window display function in the system mentioned just above, it is possible to generate simultaneously on one and the same screen both a joint use window for displaying the same document in at both terminals through inter-terminal communication and a local window for displaying a document or data to be used only in the one terminal. In conjunction with the communication system including the multi-window terminals mentioned above, there is known an approach, as proposed in JP-A-63-67958, according to which the positional information of the local windows is mutually transferred between the interconnected terminals so that the user of the terminal can know the state of the display on the screen of the partner terminal. With this arrangement, the user of one terminal can command the partner to displace a local window when the former desires to explain the content of a document or other data generated in an area of the window dedicated for joint use which is however covered by the local window in the partner's terminal.

SUMMARY OF THE INVENTION

It is an object of the present invention to provide an electronic interlocution system including a plurality of terminals or work stations each imparted with a multi-window function and interconnected to one another and which system can enjoy much improved information service performance. With the invention, it is also contemplated to provide an interlocutory communication method carried out by using the electronic interlocution system mentioned above.

Another object of the present invention is to provide an interlocutory communication system in which a given one of the terminals or work stations can participate in a plurality of interlocutions (or conferences) simultaneously or selectively.

A further object of the invention is to provide a joint information processing system in which the users of a plurality of terminals or stations interconnected through communication channels can individually prepare data while conducting an interlocution in parallel by referring to the information for joint use, wherein the prepared data can be added to the joint information to thereby improve the efficiency of the interlocution.

In view of the above and other objects which will be more apparent as this description proceeds, it is proposed according to a general aspect of the present invention that in a communication system including a plurality of stations each having a multi-window function and connected to a communication channel system, a control communication path or route is first established between a plurality of the stations among which the interlocutory communication is to be performed, and then a logical communication route is established among those of plural application programs (processing programs) of the stations which are to be executed jointly. Parenthetically, the application programs interconnected through the logical communication route are herein referred to as interlocution object programs. In work station incorporating multiwindow function, a plurality of application programs corresponding, respectively, to a plurality of windows generated on the display screen can be caused to run selectively or in parallel to one another, wherein the results of the processings executed by the individual application programs can be outputted to be displayed in the associated windows, respectively.

In the system according to the invention, when data or a command is inputted to the interlocution object program in one station, involving a change in the content displayed in a window on a display screen of the station as the result of data processing, the data or command mentioned above is also inputted to the interlocution object program of other station(s) by way of the logical communication route (the entity of which is same as the control communication route or path mentioned above), whereby window displays of the same content are generated in all the work stations interconnected by the control communication route or path. When the logical communication route is disconnected, the interlocution object programs resume ordinary local processing of application programs capable of running on the associated stations, respectively, wherein data or a command supplied to the application program is prohibited from being transmitted to other station(s). For realizing the establishment and disconnection of the control communication route and the logical communication route as well as transmission of data or a command to another station and distribution of them to the interlocution object program of the one station, there is provided an interlocution control program in each work station according to a teaching of the present invention.

One interlocution control program can control a plurality of the interlocution object programs, whereby a plurality of windows on the display screen can be made to participate in the interlocutory communication in an arbitrary manner. Further, by providing a plurality of interlocution control programs for each station, it is possible for a given one of the stations to participate simultaneously in two or more interlocutory communications.

According to another aspect of the invention, the user of one station can communicate with the user of another station by selecting a display generated in one window on the display screen, while locally executing a document create processing by using another window, wherein the document thus created may be affixed to the interlocution object window or alternatively the local window can be changed over to the interlocution object window. Thus, the joint information processing can be performed with significantly improved efficiency.

The foregoing and other objects, advantages, manner of operation and novel features of the present invention will be understood from the following detailed description of the preferred and exemplary embodiments of the invention when read in connection with the accompanying drawings.

BRIEF DESCRIPTION OF THE DRAWINGS

FIG. 5 is a conceptual view for illustrating relations between interlocution control programs for realizing electronic interlocution and other programs;

FIGS. 10A to 10D are diagrams for illustrating examples of menu displayed in the work station for inputting of commands for executing the electronic interlocution;

FIGS. 23A to 23E are diagrams for illustrating manners of processing for preparation and transfer of a data interchange file;

DESCRIPTION OF THE PREFERRED EMBODIMENTS

In the following, an electronic interlocution system according to the present invention will be described in conjunction with an exemplary or preferred embodiment thereof by reference to the accompanying drawings. The electronic interlocution system is intended to back up both acoustically and visually with the aid of a data processor (computer) the interlocution between distantly located subscribers which has heretofore been carried out by making use only of telephone equipment.

Figure 1:
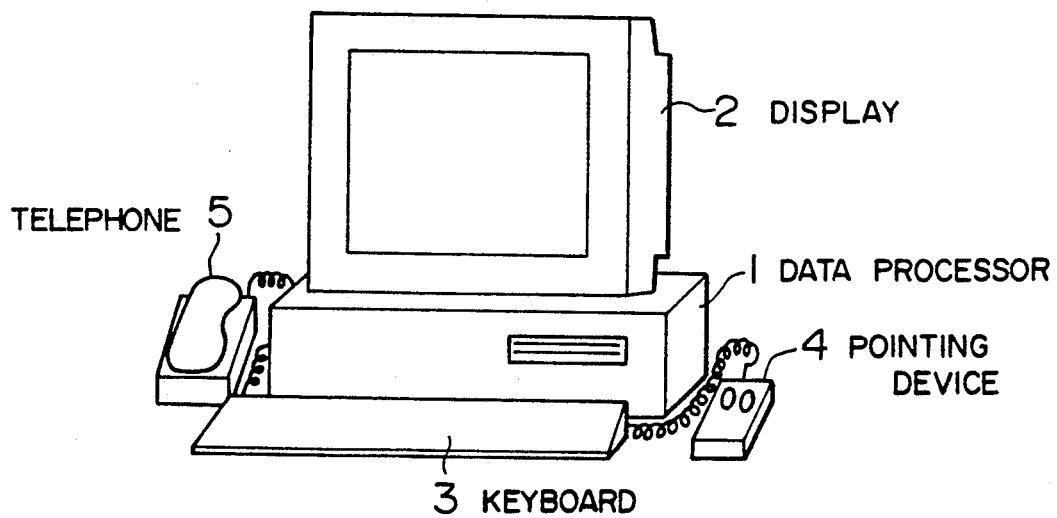
FIG. 1 is a schematic pictorial view showing an electronic interlocution apparatus or work station for carrying out the present invention.

FIG. 1 is a schematic pictorial view showing of an electronic interlocution apparatus or work station with which the present invention is concerned. The illustrated electronic interlocution apparatus generally comprises a main body of a data processor 1, a display 2, a keyboard 3, a pointing device 4 and a telephone set 5. The keyboard 3 is mainly used for inputting characters and numerals, while the pointing device 4 serves as the means for designating positions of concern on the display and/or specifying an item or items to be selected from a menu containing a number of alternative items. The telephone set 5 presents the input/output means for acoustic communication between users or interlocutors. These component devices are, by way of example, so consolidated that the names of partners for communication are displayed on the display screen 2 to thereby allow the name of the desired partner to be selected by means of the pointing device 4 so that the user can call on the telephone without being conscious of the telephone number. The data processor serves to send out a synthesized voice through the telephone system or store the incoming voice information so that it can be utilized later on. In an electronic interlocution system according to the present invention, there are used a plurality of the work stations which can perform interlocution by utilizing or operating the visual information generated on the display 2 by means of the keyboard 3 and/or the pointing device 4 in addition to the voice information available through the telephone sets. Further, by processing the information mentioned above by the data processor 1, the information processing activities which are impossible only with voice information can also be performed. The electronic interlocution apparatus can be utilized independently and individually as a conventional terminal computer, such as the work station, wherein it is possible to perform electronic interlocution with a plurality of other work stations when the work station is being independently used or reversely to perform the work of the work station separately and individually during the electronic interlocution.

Figure 2A:
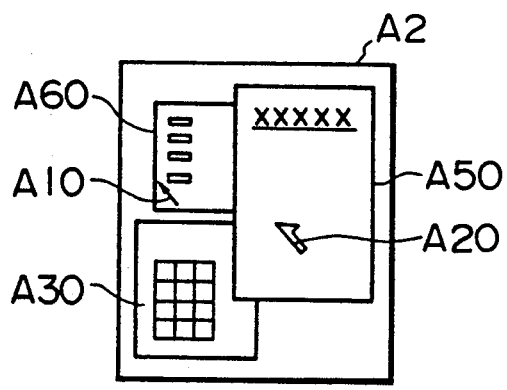
FIGS. 2A to 4B are diagrams showing typical examples of displays and operations on a display device.
Figure 2B:
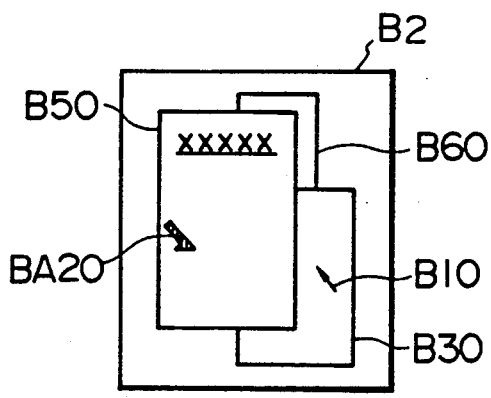
Figure 3A:
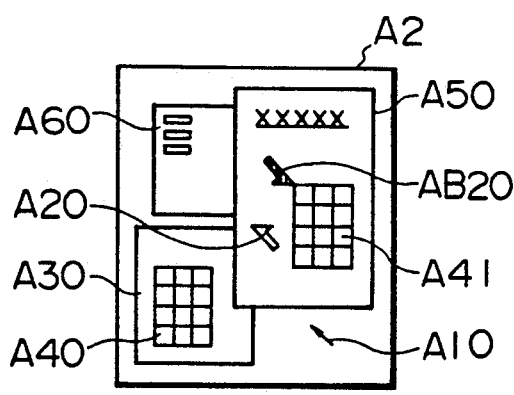
Figure 3B:
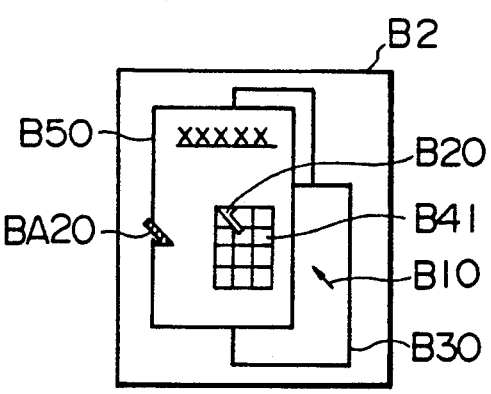
Figure 4A:
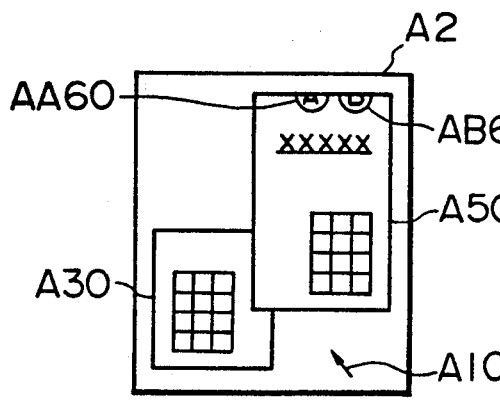
Figure 4B:
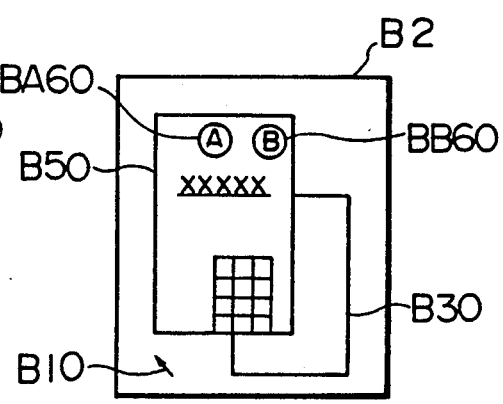

FIGS. 2A to 4B show typical examples of displays and operations on the display unit 2 observed upon execution of the electronic interlocution according to the teaching of the present invention. It is assumed that the users perform interlocution by using the work stations A and B. FIGS. 2A, 3A and 4A show the displayed information in the work station A at a certain time point, while FIGS. 2B, 3B and 4B show the displayed information generated in the work station B in correspondence to the information shown in FIGS. 2A, 3A and 4A, respectively. In the figures, A2 denotes the display of the work station A and B2 denotes that of the work station B. The users of the work stations A and B can watch the same document generated on window areas A50 and B50 of the displays of the respective work stations in the course of conversation with each other using the respective telephone sets. Each of these windows A50 and B50 is herein referred to as an interlocution window. Both of the users can perform freely an operation for editing or other works on the documents displayed within the interlocution windows A50 and B50, the results of all the operations being reflected simultaneously onto the displays generated in both the work stations. By way of example, when a title "xxxxx" of a document displayed in the work station A is deleted, not only the title observed in the interlocution window A50 but also the title appearing within the window B50 is erased. Reference characters A60 and B60 denote interlocution control windows, respectively, in which menus containing various commands for the control of interlocution are displayed. When one command is designated selectively from the menu by a user by means of a cursor A10 or B10, a command can be issued to an interlocution control program described hereinafter. The command menu contains a plurality of data names corresponding to document data prepared previously or icons indicative of these documents. When any given data is specified by the user with the cursor A10, an application program corresponding to that data is activated, whereby the content of that data is displayed within the window A50 or A30. On the other hand, when the user designates specifically particular data and inputs a joint use command, an application program corresponding to this data is activated as an interlocution program, and the data is displayed within the interlocution window such as window A50. Reference characters A20, B20, AB20 and BA20 denote pointing objects (also referred to simply as PO hereinafter) which are used for indicating positions or locations on the display as well as confirmation thereof. With the aid of these object pointers or POs, the user can visually indicate distinctively the location or object designated by him or her to the remote partner of the interlocution. In this manner, conversation or transfer of information can be realized and promoted with an improved understandability when compared with the conversation through the telephone only. The pointing object or PO A20 and B20 are manipulated in the work stations A and B, wherein the POs corresponding to A20 and B20 are displayed as the PO AB20 and BA20 in the respective work stations A and B. The user of the work station A is referred to as the owner of the pointing objects A20 and BA20. Each user can create, move and delete his or her own POs. The results of this manipulation of POs brings about not only corresponding changes of the PO displayed in the one work station but also are similarly reflected onto the POs displayed in the partner work station. It should be mentioned that the PO differs from the cursor A10 or B10 moved on the display screen in response to the operation of the pointing device 4. Although the cursor A10 or B10 can be moved to any given position on the overall display screen, the movement of the PO is limited within the window area for the interlocution. The PO and the cursor are moved independent of each other. In the case of the illustrated embodiment, however, it is assumed that the pointing device 4 is made use of as the means for commanding the movement of the PO. More specifically, the cursor A10 (or B10) is positioned on the PO A20 (or B20) in the mode referred to as "MOVE PO mode", wherein the PO is moved in following up the movement of the cursor. The pair of mutually corresponding POs A20 and BA20 are each required to designate or indicate the same part of the same object on the display screens in both of the work stations. It is however desirable to arrange for the shape, colors and the like of the PO of the displayed object to be selected individually and separately as desired by each user. By way of example, in the case of the illustrated embodiment, the PO A20 (or B20) making appearance on the display screen A2 (or B2) is represented by a solid arrow heading upwardly to the left while the partner's PO AB20 (or BA20) appearing on that display screen is represented by a hatched arrow heading downwardly to the right, so that the one PO and the partner's PO can distinctively be recognized by the user. As another shape with which the PO can be displayed, it is conceivable to make the shapes of the POs depend on the owners. By way of example, the PO on the display of the work station A may be represented by an arrow with the PO on the display of the work station B being in the form of a hand. In FIGS. 2A and 2B, there is illustrated a scenario in which the user of the work station A is performing interlocution with the user of the work station B while indicating with his or her own PO A20 an item for the object of the conversation. In these Figures, A30 and B30 denote local windows displaying the data being accessed by the users, respectively. By way of example, the local window A30 is the window within which data A20 constituting the material for the discussion with the user of the work station B is being prepared by the user of the work station A, while the window B30 shows an arrival status of the mails from the other work stations making address to the user of the work station B. Incidentally, for the purpose of facilitating discrimination between the individual access area (windows A30, B30) and the joint document area (window A50, B50), it is preferred to differentiate, for example, the shape of the window frame, color or the background color of the latter from that of the other windows on the display screen. In FIGS. 3A and 3B, there is illustrated a state in which the data or material prepared by the user of the work station A is determined to be used as the document for the object of conversation in the course of the interlocution mentioned above, whereon the data A40 resident within the local window A30 is affixed to the interlocution window A50 so that the data in question can be utilized as A41 and B41 by the users of both of the work stations A and B. Finally, FIGS. 4A and 4B show the state in which preparation of the document (A50, B50) by the users of both the work stations has been completed and the content of the document is confirmed. This operation is referred to as authentication (or confirmation). The purpose of the authentication is to ensure that the data being observed by the interlocutors on the respective displays actually coincide with each other and to make available such tool or means which serves to verify readily such possibility that the document or data prepared in the course of the electronic interlocution or memorandum concerning the mutual agreement is altered or corrupted later on. In the case of the illustrated embodiment of the invention, reflection of the operation for authentication onto the document on the display screen is realized by displaying a picture such as a seal image to thereby express the state in which the signatures of the interlocutors are affixed, respectively. A reference character AA60 denotes a seal image of the user A displayed on the display screen A2, AB60 denotes a seal image of the user B displayed on the display screen A2, BA60 denotes the seal image of the user A displayed on the screen B2 and BB60 denotes the seal image of the user B generated on the display B2. The authentication is executed only when the contents of the documents observed by both users perfectly coincide with each other, whereupon the seal images are displayed. Of course, these seals are mere images. However, they are advantageous in that the data and document which have undergone the authentication processing can be discriminatively recognized at once simply by glancing at them. In the case of the illustrated embodiment, the authentication operation described above is attended with mutual exchange of the authentication data which can be prepared only by the authenticators on the basis of the content of the document or the names of the authenticators, wherein the authentication data is held or stored together with the content of the document or data. In this way, once the document or data has been prepared, it becomes impossible to alter the data authenticated by the other, even though the authenticated data can be modified later on. Thus, the authenticity or correctness of the document prepared jointly between the interlocutors can be ensured.

FIG. 5 shows a basic mechanism for executing simultaneously the joint work such as interlocution and the individual or independent work as described above as the examples of operation performed by using the work station (computer). In this connection, the interlocutors or the work stations therefor are represented by A and B, the displays used by them are denoted by A2 and B2, the interlocution windows for displaying the document prepared jointly by the users A and B are denoted by A50 and B50, and the local windows for displaying the document and data used individually are denoted by A30 and B30, respectively. In each of the work stations, the processing for receiving or accepting the inputs from the keyboard 3 and the pointing device 4 as well as the output processing for the generation of the data on the display 2 is executed through a window management system 140A or 140B. The data processings within the individual windows are executed by using corresponding application programs (or processing programs) 130A, 130B, respectively. Of these application programs, the program corresponding to the interlocution window is herein referred to as the interlocution object program and is denoted by 120A, 120B. In this regard, it should be noted that a plurality of interlocution windows can simultaneously be established to thereby activate a plurality of interlocution object programs in one work station as well. The electronic interlocution natural to the participants requires that the interlocution object program reflects onto itself the operations or manipulations by the individual interlocutor on a real time basis. For controlling operation of each the object program and displaying the same content resulting therefrom on each display device, an interlocution control program 100A (100B) is provided according to the present invention. In the case of the work station known heretofore, the interlocution object program 120A (120B) fetches the input from the window management system 140A (140B) by itself. In contrast, in the case of the electronic interlocution system according to the present invention, the input from the window management system 140A (140B) is first fetched by the interlocution control program 100A (100B) which then transfers the input to the interlocution object program 120A (120B) controlled by that interlocution control program 100A (100B) and at the same time sends the input to the other interlocution control program 100B (100A) for thereby causing the latter to control the interlocution object program of the partner (counterpart) work station. For the purpose of enabling the communication between the interlocution control programs, there is provided an interlocution control route or path 70. Further, in order to distribute the data to the interlocution object programs, there is also provided a logical interlocution (or communication) route (or path) 80. Establishment of the logical interlocution route 80 is realized by the individual interlocution control programs by using the interlocution control route 70. As will be described in detail later on, by disconnecting only the logical interlocution route 80, a handling of information restricted to the operation at the level of the interlocution control between the interlocution control programs 100A and 100B can be performed without interlocking the interlocution object programs 120A and 120B with each other such as, for example, the supply of data possessed by one of the work stations to the partner work station through a file transfer for data interchange to thereby allow the latter to make preparation for the interlocution operation to be performed subsequently. When the interlocution control route 70 is disconnected, the interlocution object programs 120A and 120B are prevented from being interlocked, whereby each work station can be operated independently or isolatedly by the user as in the case of a conventional work station. With the interlocution control route 70 and the logical communication route 80, it is also possible to interconnect n work stations in a loop-like or tree-like configuration in addition to the interconnection between two work stations.

Figure 6:
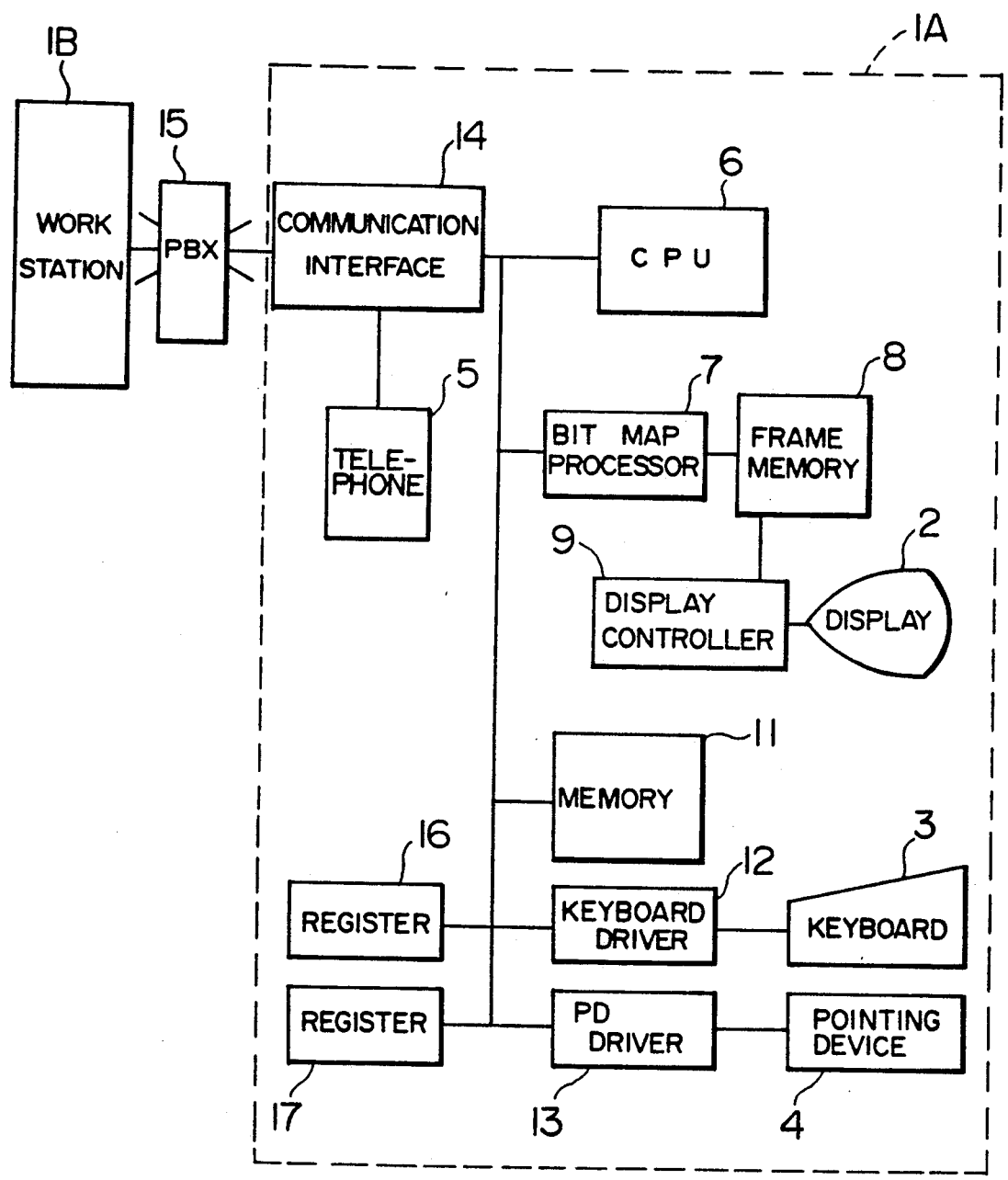
FIG. 6 is a block diagram showing a basic structure or arrangement of the electronic interlocution system composed of two work stations.

FIG. 6 is a block diagram showing a basic structure or arrangement of the electronic interlocution system composed of two work stations 1A and 1B according to an embodiment of the present invention. Referring to the Figure, a central processing unit (CPU) 6 executes processings in accordance with program instructions read out from a memory 11. The memory 11 stores therein a variety of programs such as the interlocution control program, a communication program and application programs including the interlocution object program as well as interlocution object data and other information. Generation of a display on a display device 2 is performed by a bit map processor (BMP) 7 in response to a command issued by the CPU 6 to the BMP 7. In accordance with the command supplied from the CPU 6, the BMP 7 manages a frame memory 8 which stores therein the data for the display in the form of image data. The content of the frame memory 8 is displayed on the display device 2 through a display controller 9. A keyboard driver 12 serves to store codes inputted from the keyboard 3 in a register 16. A pointing device driver 13 serves for storing the data inputted through a pointing device (PD) 4 in a register 17. In the case of the illustrated embodiment, there is employed as a communication device between the work station (computer) and the telephone set a PBX (Private Branch Exchange) providing an ISDN (Integrated Services Digital Network) interface capable of processing the voice and data communications through a single circuit. Each computer typified by the CPU 6 and the telephone set 5 are connected to the PBX 15 by way of the associated communication interface 14 and perform communication with the counterpart by way of the PBX 15. Establishment of the interlocution route 70 extending through the PBX 15 and the data communication between the data processors (computers) by making use of the interlocution route 70 are implemented by the CPU 6, while voice communication after establishment of the interlocution route 70 is carried out by using the telephone set 5. It should however be mentioned that the telephone set alone may be connected to the exchange while the communication between the computers may be realized by making use of another network such as a LAN (Local Area Network), a packet-switching exchange or the like.

Figure 7:
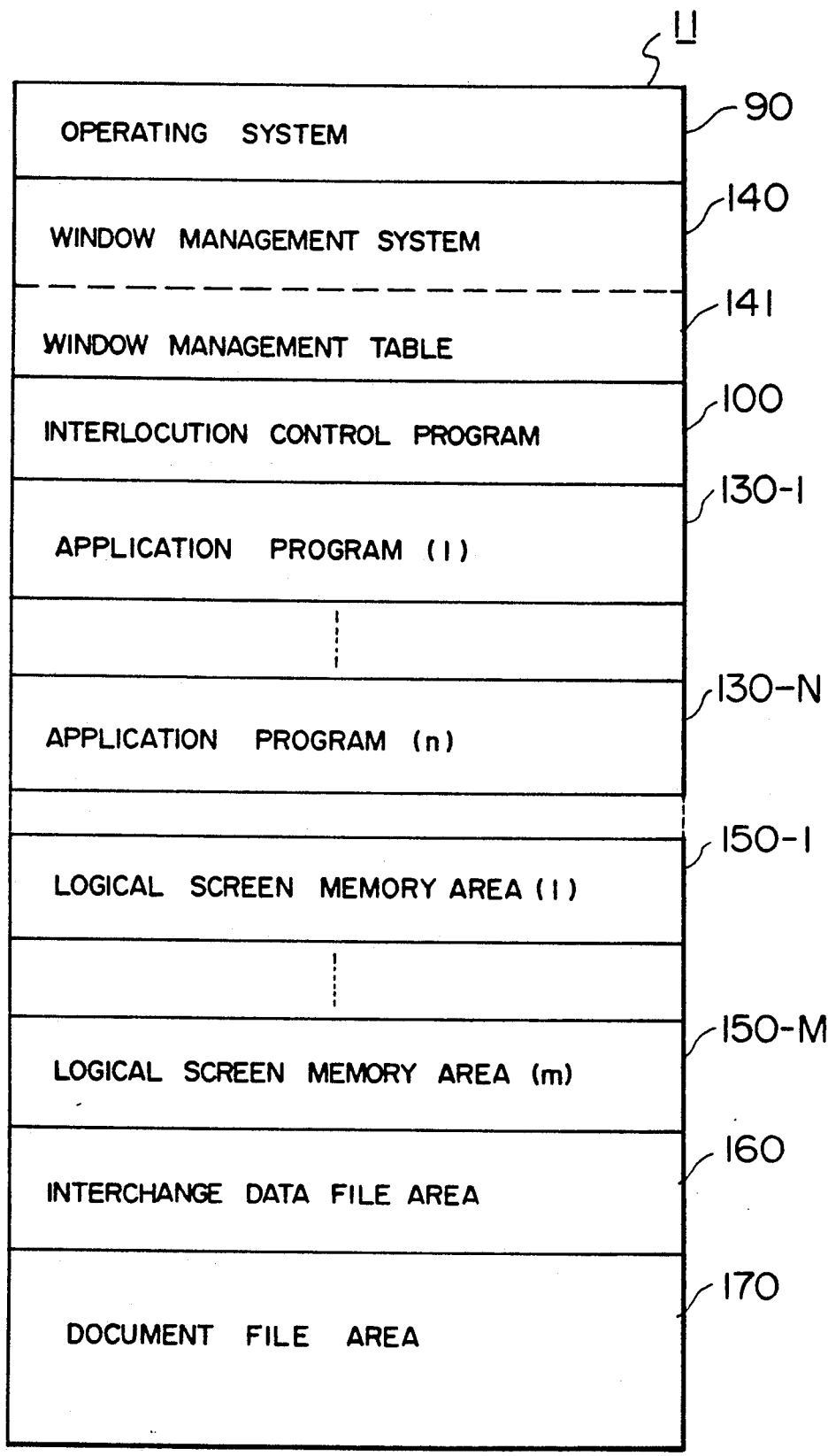
FIG. 7 is a diagram showing a variety of programs and data areas prepared in a memory (11)

FIG. 7 is a diagram showing a variety of programs and data prepared and stored in the memory 11. The memory 11 includes an operating system (OS) 90, a multi-window management system 140 for performing the control of multi-window display operations, a window management table 141 made use of by the system 140 mentioned above, at least one interlocution control program 100 described hereinafter in detail, a plurality of application programs 130-1 to 130-N having specific functions, respectively, memory areas (hereinafter referred to as logical screen memory areas) 150-1 to 150-M provided in correspondence with the plurality of windows established on the display screen for storing therein the results of the processings executed by the application programs, respectively, an interchange data file area 160 for storing the data to be supplied to the other work station(s) and a document file area for storing the document data already prepared. Parenthetically, a part of the memory 11 may be constituted by a secondary memory, such as a floppy disc, so that the program or data can be loaded in the high-speed memory area, as occasion requires.

Figure 8:
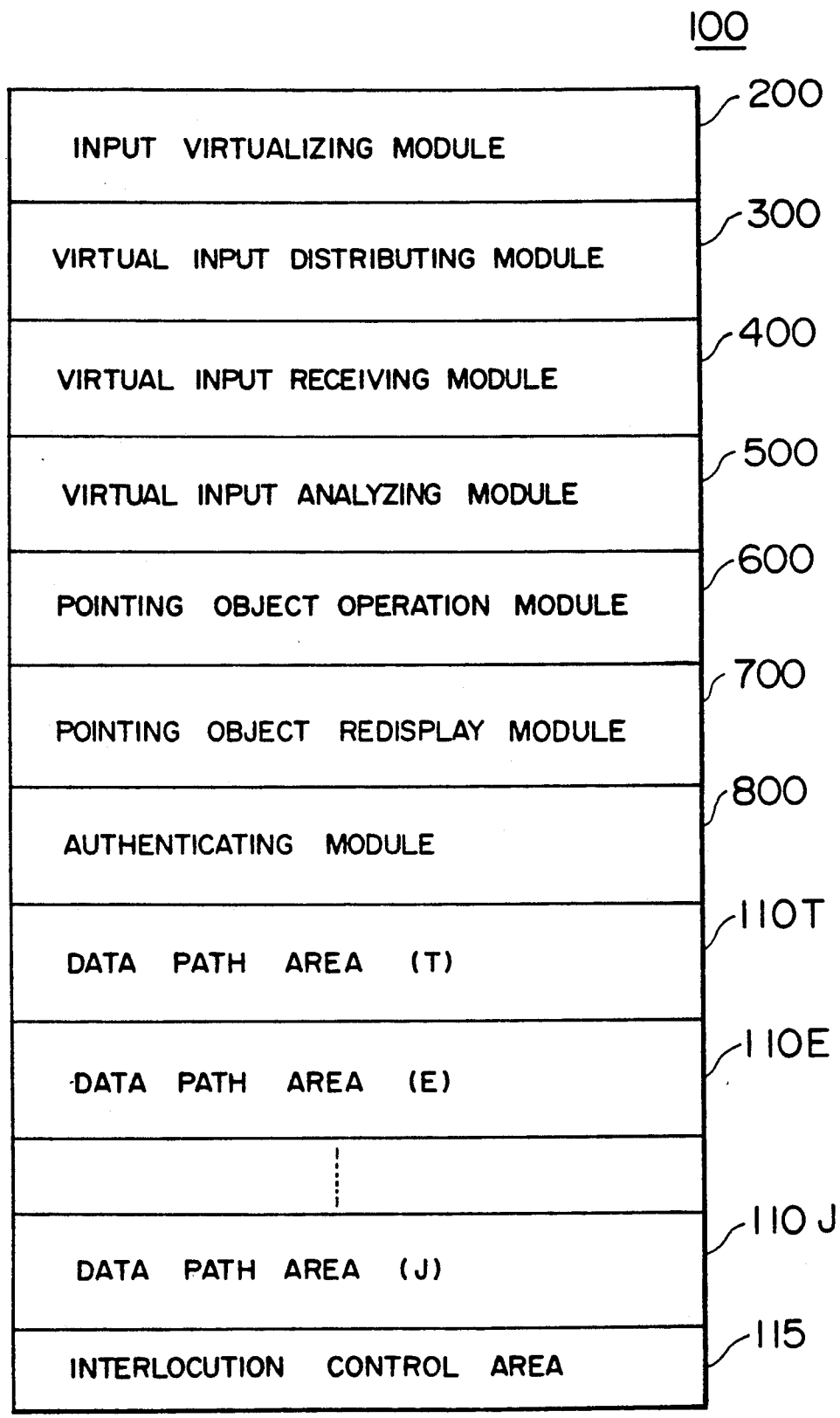
FIG. 8 is a diagram showing an exemplary structure of the interlocution control program (100)

FIG. 8 shows an exemplary structure of the interlocution control program 100. As will be seen in the figure, the interlocution control program 100 includes an input virtualizing program module 200, a virtual input receiving module 400, a virtual input analyzing module 500, a pointing object (PO) operating module 600, a pointing object (PO) redisplay module 700, an authenticating program module 800, data path areas 110T to 110J used for transfer of data or commands among the modules mentioned above and an interlocution control area 115 for storing a variety of data. One interlocution is controlled by a set of interlocution control programs. Each of the work stations is equipped with a plurality of the interlocution control programs for realizing simultaneously a plurality of interlocutions.

Figure 9:
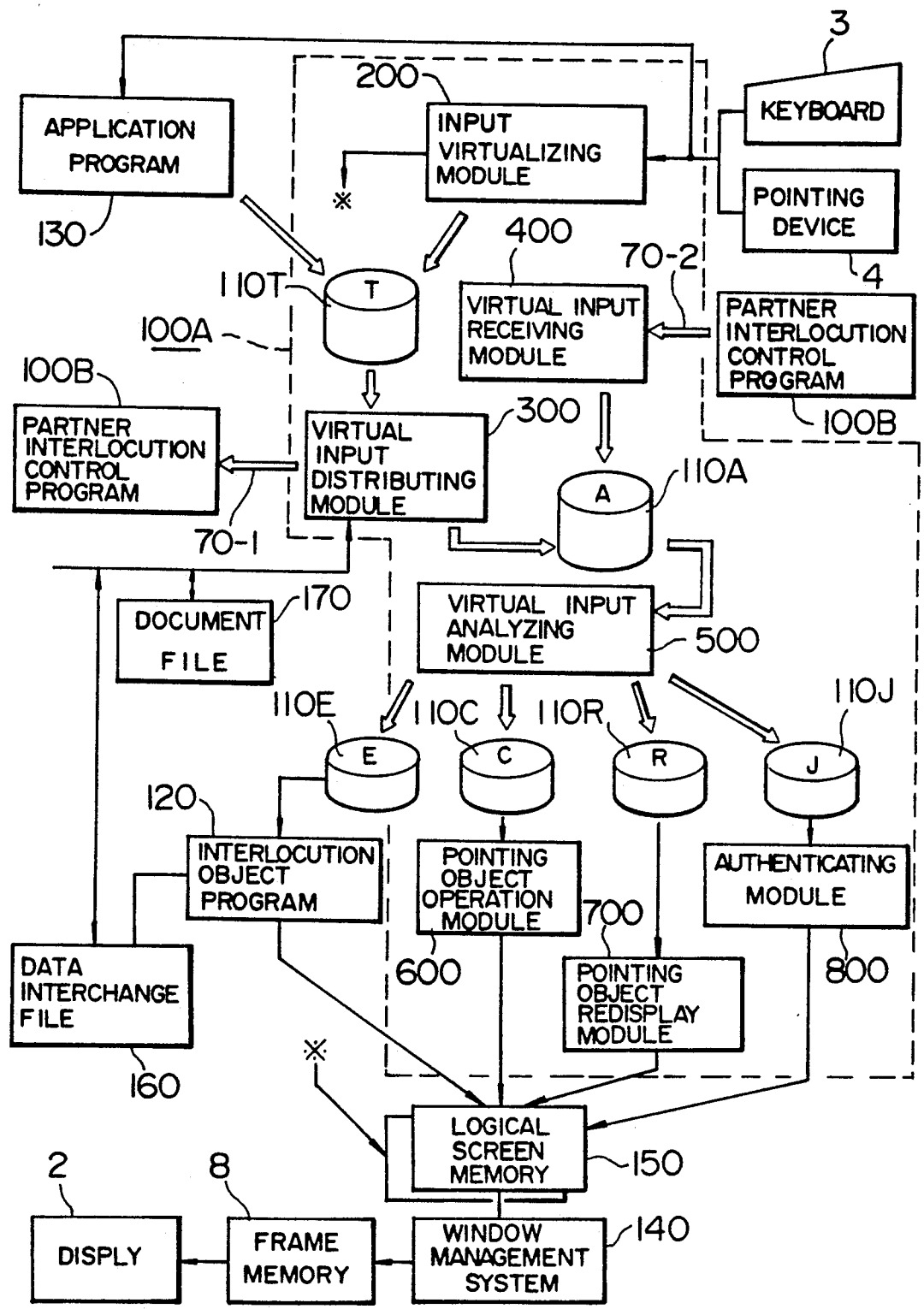
FIG. 9 is a diagram for illustrating relations existing among individual modules of the interlocution control program and relations of the interlocution control program to the other programs.

FIG. 9 is a diagram for illustrating relations existing among the individual modules of the interlocution control program described above and relations of the interlocution control program to the other programs.

In the first place, description will be made of a data path. The data path is used for realizing the transfer of data between two processes (program modules), which may be identical with each other. The processes desiring the data transfer establish a data path between them. The process which has the data to be sent out places the data on the data path, while the counterpart process to receive the data fetches it from the data path. The sequence in which the data is fetched conforms to the order in which the data have been placed, whereby the data is fetched data by data in the order as they has been placed. Utilization of the data path is not restricted to the two particular processes. Suppose, for example, that a plurality of processes desire to send data to one process. In that case, only one data path is provided, wherein the processes having the data to be sent out place the data on the data path, while the receiving process fetches the data from the data path. The direction of the data flow along the data path can be selected to be unidirectional (one-way) or bidirectional (two-way) and can freely be established by the processes using the data path. In the following description concerning the functions of the individual modules by reference to FIG. 9, details of the data format and the state table are excluded, which will be made later on after the description of the modules.

Now referring to FIG. 9, the input data (or commands) from the input device such as the keyboard 3, the pointing device 4 or the like are first received by an input virtualizing module 200 and then placed on the data path 110T provided between the module 200 and a virtual input distributing module 300. It is to be noted that data or commands from other application program 130 are also placed in the abovementioned data path 110T. In the present application, the phrase "virtual input" is used for representing both the input from the input device and the input from the program. The data placed in the data path 110T are received by the virtual input distributing module 300 regardless of the sources in which the data originates. By virtue of the functions of the input virtualizing module 100, the data path 110T and the virtual input distributing module 300, the interlocution control program can be operated from the input devices or from the programs inclusive of the interlocution control program itself. The virtual input distributing module 300 serves the basic function of presenting visually the same content to the interlocutors participating in the electronic interlocution. More specifically, the data received from the data path 110T is transmitted to other modules described below to be processed internally by the interlocution control program and at the same time is sent to the counterpart interlocution control program 100B by way of the interlocution control route 70-1 for allowing similar processings to be executed by the partner work station. The processings of data by the partner's interlocution control program to which the data is transferred as described above is the same as the processing performed by the virtual input receiving module 400 on the data received from the partner's interlocution control program 100B by way of the interlocution control route 70-2. The functions of the interlocution control program may generally be classified into operation of the interlocution object program, the control of the PO (pointing object) and the confirmation or authentication of the results of the interlocution by both the interlocutors. For deciding which of the functions mentioned above is to be performed, the data stored in the data path 110A is analyzed by a virtual input analyzing module 500. When the data implies the operation of the interlocution object program 120, that data is transferred to the interlocution object program 120 by way of a data path 110E. On the other hand, when the data implies the operation of the PO, that data is transferred to a PO operation module 600 by way of a data path 110C, while the data implying the redisplay of the pointing object is transferred to a pointing object redisplay module 700 by way of a data path 110R. Finally, data implying the authentication operation is transferred to an authentication module 800 by way of a data path 110J. The interlocution object program 120, the pointing object operation module 600, the pointing object redisplay module 700 and the authentication module 800 output data, such as text, table, graph, graphics, image and/or the like data which constitute the object of the interlocution to a logical screen memory (virtual terminal) 150 in accordance with the results of the processing performed by the modules mentioned above. The results as outputted are displayed on the display device 2 with the aid of the window management system 140.

FIGS. 10A to 10D show examples of the menu screen image displayed in the work station 1 for the inputting of operation commands by the user in the course of execution of the electronic interlocution. These menu screen images are displayed within one interlocution control window A60 or B60 provided on the display 2.

More specifically, FIG. 10A shows an example of a menu screen image displayed in response to the selection by the user of a command or icon designating the electronic interlocution or electronic conference from a function selecting menu displayed by the OS (operating system). In this state, it is possible to select by means of the cursor either one of "interlocution control menu" 71, "telephone" 72 and "conference document list" 73.

When the user selects the interlocution control menu 71, a menu shown in FIG. 10B is displayed, whereby it is now possible to select one of "participation in interlocution" 71A, "designation of member" 71B, "leaving from interlocution" 71C, "ending of interlocution" 71D. When the member designation 71B is selected, there is displayed a list of members prepared already. When a partner of the interlocution is selected from the displayed list, a command is issued for establishing the interlocution control route 70 for the counterpart work station of the selected partner. When a person desired for participation in the interlocution is not found in the member list mentioned above, the data for specifying the counterpart work station may be inputted from the keyboard.

When the telephone 72 is selected, there is displayed a telephone number list 72A shown in FIG. 10C, wherein communication by automatic dialing can be performed with the member designated in the list.

Upon selection of one of the documents (1) to (L) shown in the conference document list 73, a menu shown in FIG. 10D is displayed, whereby selection of command is rendered possible from an command 73A for commanding distribution of the document, a joint use command 73B for establishing the logical communication route 80 for the interlocution concerning the document displayed in the document displaying window, a command 73C for stopping the joint use, a command 73D for withdrawal of the documents distributed to the participants in the conference or interlocution and disconnecting the logical communication route, a command 73E commanding preparation of the pointing object (PO), a command 73F commanding deletion of the pointing object, a command 73G commanding the start of a PO session, a command 73H commanding the end of the PO session, a command 73J for prohibiting operation to the interlocution window in the other work station while commanding the stopping of interlocution for establishing the mode to prevent the result of operation to the interlocution window in the own work station from being transmitted to the other work station(s), a command 73K for invalidating the mode mentioned above and commanding the restart of the interlocution, a command 73L commanding the joint use of data with the other station(s), a command 73M commanding the changing over of the window with the local window for the individual use, and a command 73N commanding the data authenticating (confirming) operation.

Now, the functions of the individual modules mentioned hereinbefore will be described in detail.

Figure 11:
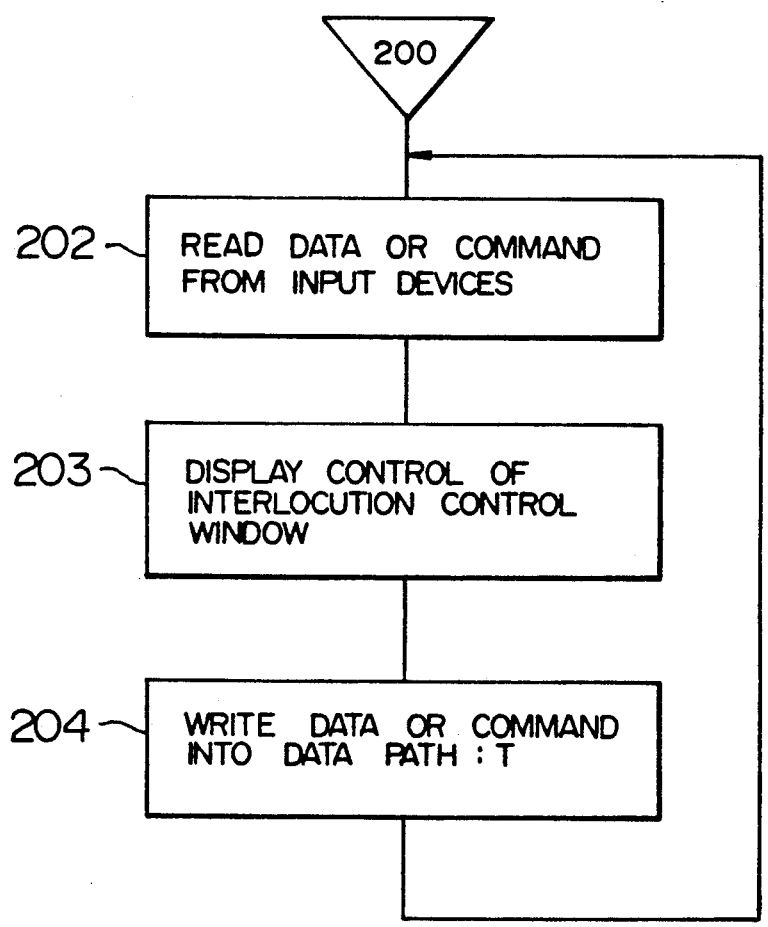
FIG. 11 is a flow chart for illustrating an operation procedure performed by an input virtualizing module (200)

FIG. 11 shows a processing flow performed by the input virtualizing module 200. This module 200 receives data from the individual input devices 3 and 4 connected to the CPU (step 202) and places the data in the data path 110T (step 204). When the input data is for the menu selection in the interlocution control window A60, the menu screen image is updated in accordance with the result of the selection, as described above by reference to FIGS. 10B to 10D (step 203). When one document is selected from the document list 73 in the menu screen image shown in FIG. 10A, an application program corresponding to this selected document is activated by the function of the OS 90, whereon a new window for displaying the abovementioned document makes appearance on the display screen.

Figure 12A:
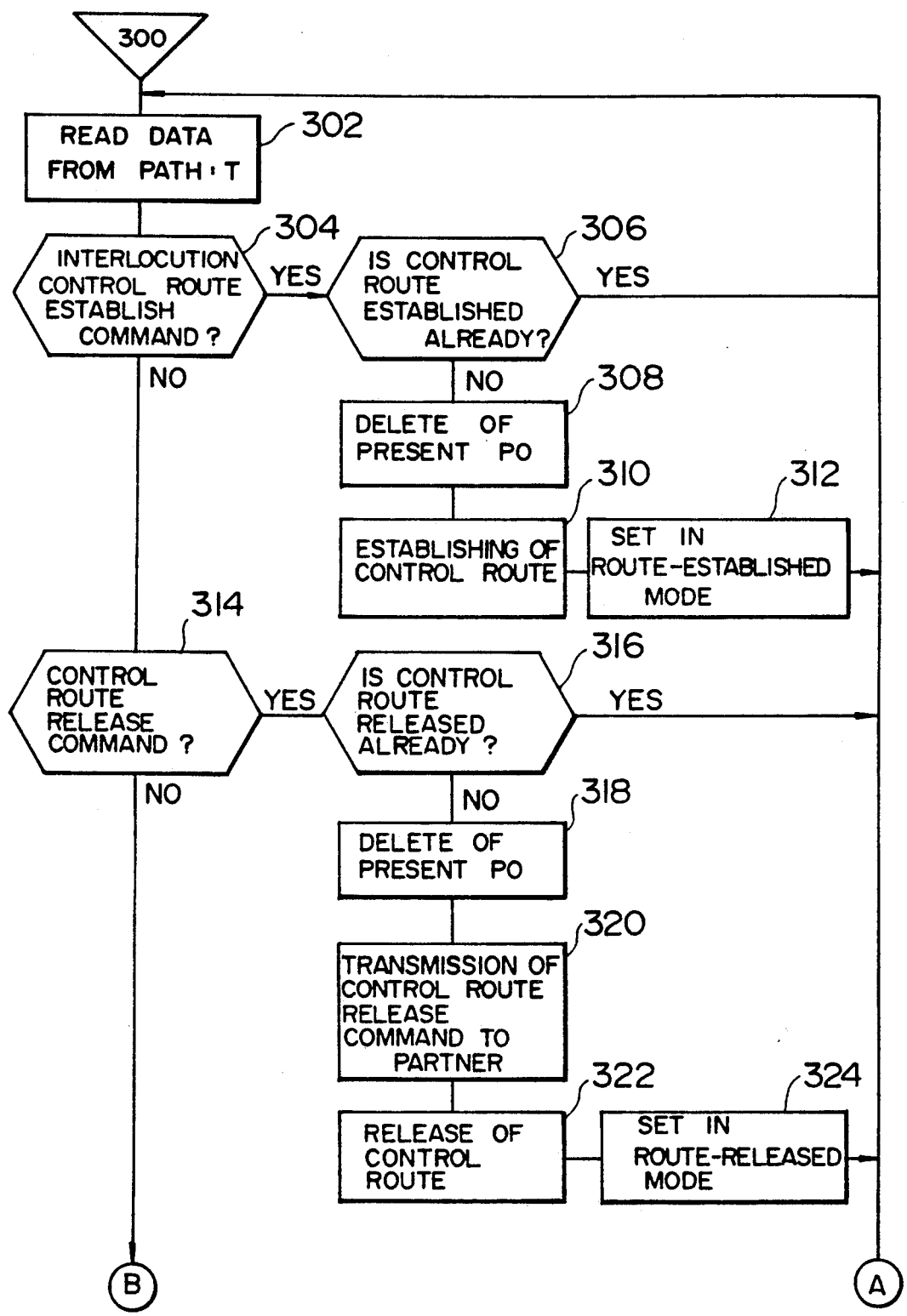
FIGS. 12A and 12B are flow charts for illustrating an operation procedure performed by a virtual input distributing module (300)
Figure 12B:
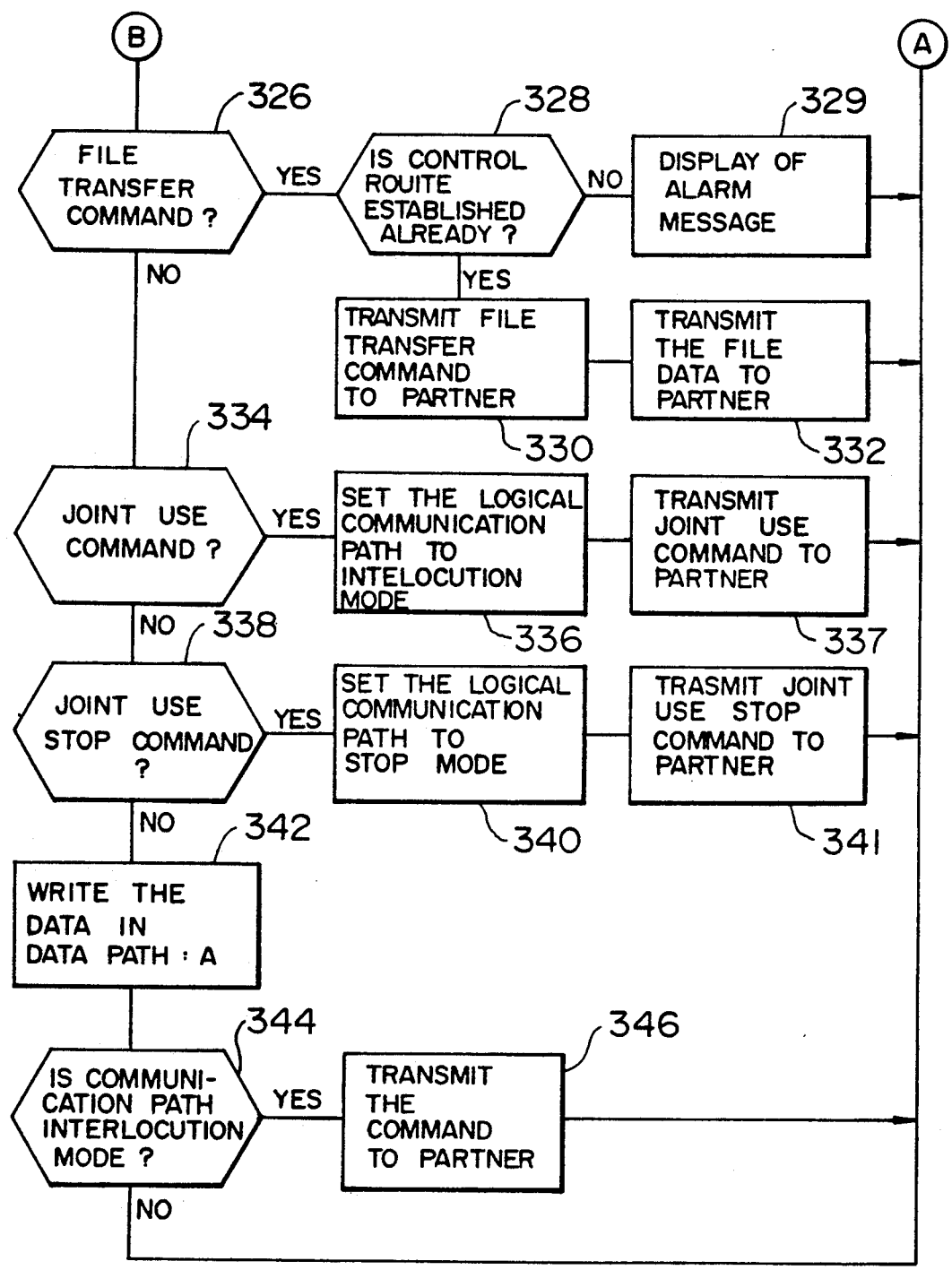

FIGS. 12A and 12B show flows of processings carried out by the virtual input distributing module 300. This module 300 first fetches the data placed in the data path 110T (step 302). When the input data is the command for establishing the interlocution control route 60 (step 304), it is checked whether the control route is already established (step 306). When the control route exists (YES), nothing is done. Otherwise (NO), all the existing POs are deleted for preparation for cooperation with the counterpart work station (step 308), being followed by establishment of the interlocution control route (step 310) to thereby validate the route-established mode (step 312). At that time, by changing the color of the frame of the interlocution object window or that of the background, information is given to the user that the state ready for the interlocution has been established. In case the input data is a command for releasing the control route (step 314), it is confirmed whether the interlocution control route has been released or not (step 316). When released, nothing is done. Otherwise, all the existing PO are deleted in preparation for the re-joint with the counterpart or partner work station (step 318). Subsequently, a command for releasing the interlocution control route is transmitted to the partner's interlocution program (step 320), being followed by releasing of the interlocution control route, whereon the route-released mode is set. At that time, the color of the frame of the interlocution object window or that of the background is changed to the color of the local window. In case the input data is a file transfer command for transferring the contents of the interchange data file 160 (step 326), it is confirmed whether the control route is already established or not (step 328). If not, the display of an alarm message is generated (step 329). Otherwise, the file transfer command is transmitted to the partner's interlocution control program (step 330), being followed by the transfer of the data interchange file (step 332).

When the input data is the command for joint use (step 334), the logical communication route or path 80 is established for allowing the window corresponding to the abovementioned command to be used as the interlocution window (step 336) and the command for joint use is issued to the partner work station (step 337). When the input data is the joint use stop command (step 338), the logical communication route or path 80 is set to the stop mode (step 340), whereon the joint use stop command is transmitted to the partner work station (step 341). It should be noted that when the commands are sent to the partner work station at the steps 337 and 341, the object (name of the document) for the joint use and the identifier of the corresponding interlocution object program are also transmitted to the partner work station. When the input data represents none of the commands mentioned above, that data is placed in the data path 110A to be transferred to the virtual input analyzing module 600 (step 324). If the logical communication route or path has been established (step 344), the data mentioned above is transmitted to the partner's interlocution control program and more particularly to the virtual input receiving module 400 (step 346). The instant module repeats the operation described above.

Figure 13:
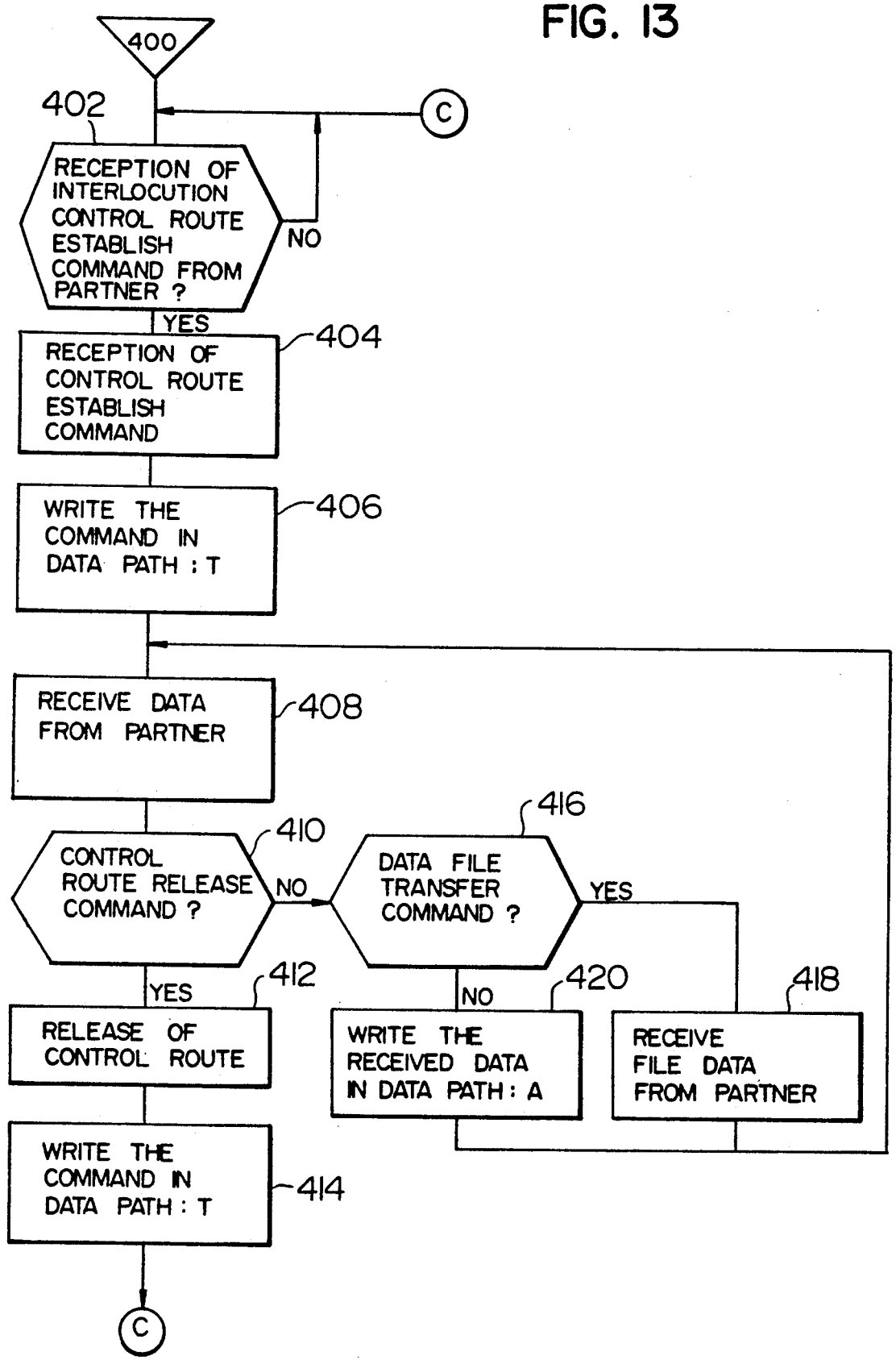
FIG. 13 is a flow chart for illustrating an operation procedure performed by a virtual input receiving module (400)

FIG. 13 shows flows of processings performed by the virtual input receiving module 400. In the case of the instant module, preparation is made for establishing the interlocution control route (step 402) while waiting for the request for establishing the interlocution control route from the partner's interlocution control program to establish the control route (step 404). Since the control route as established is for receiving the data, it is necessary that the route for data transmission be established for the virtual input distributing module 300 of its own interlocution control program. To this end, a command for establishing the interlocution control route is placed in the data path 110T (step 406). Thus, the virtual input distributing module 300 operates as if it were the case where the establishment of the interlocution control route is required through the input device. After the interlocution control route has been established in this manner, the virtual input receiving module 400 receives data from the partner work station (step 408). If the received data is the command for releasing the interlocution control route (step 410), the control route for the reception is released (step 412) and at the same time a command for releasing the control route for the transmission is placed in the data path 110T (step 414), to thereby allow the virtual input distributing module 300 to release the control route for the transmission in a similar manner as in the case of the establishment thereof, and the request for establishing the interlocution control route from the partner's interlocution control program is waited for (step 402, 404). When the data in question is the data interchange file transfer command which is one of the commands at the interlocution control level described hereinbefore by reference to FIG. 5 (step 416), the file data sent subsequently from the partner's interlocution control program is received (step 418). Unless the input data is the abovementioned command, the data is placed in the data path 110A (step 420). After the processing described above, the virtual input receiving module waits for the arrival of data sent from the partner's interlocution control program (step 408).

Figure 14A:
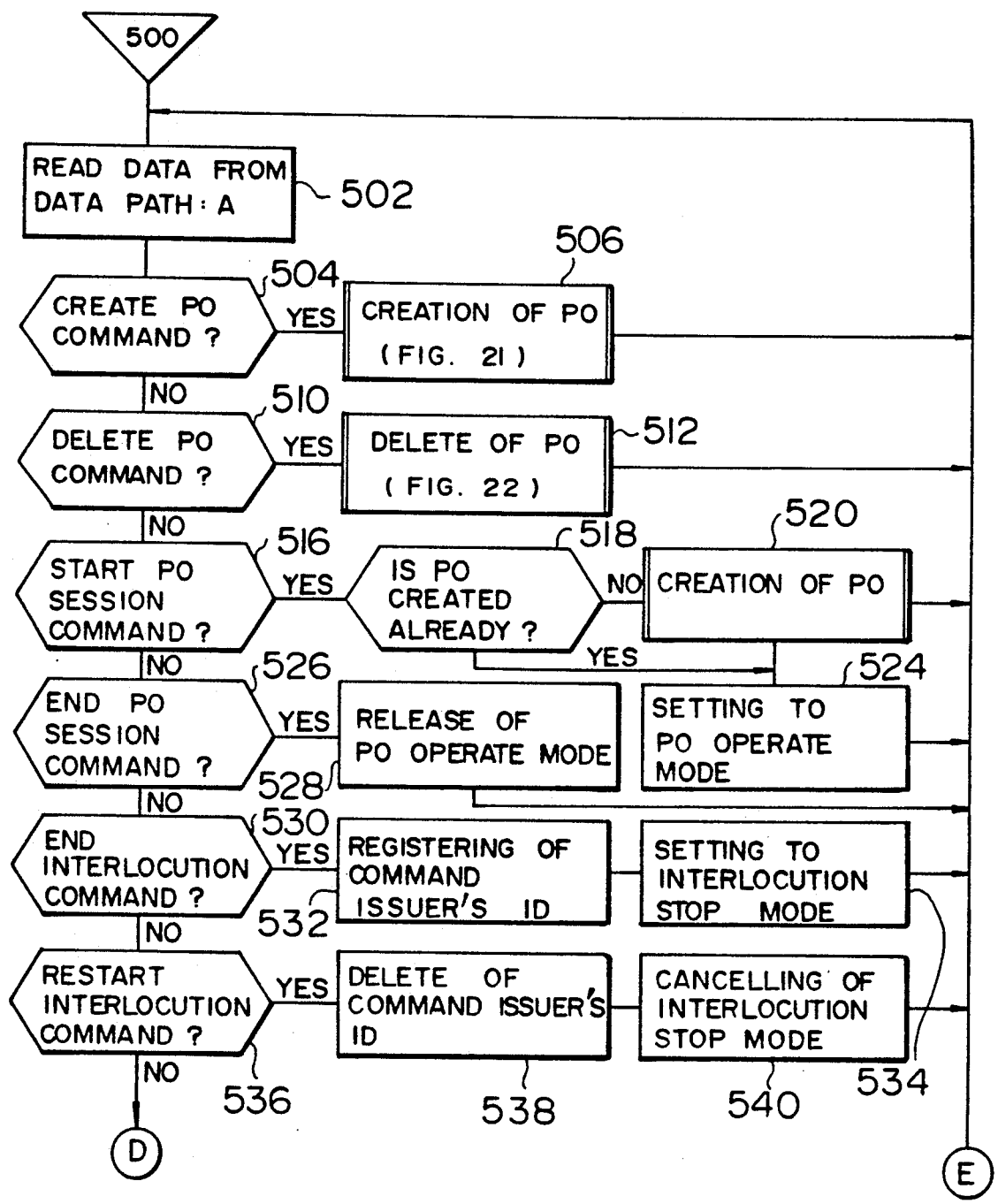
FIGS. 14A and 14B are flow charts for illustrating an operation procedure performed by a virtual input analyzing module (500)
Figure 14B:
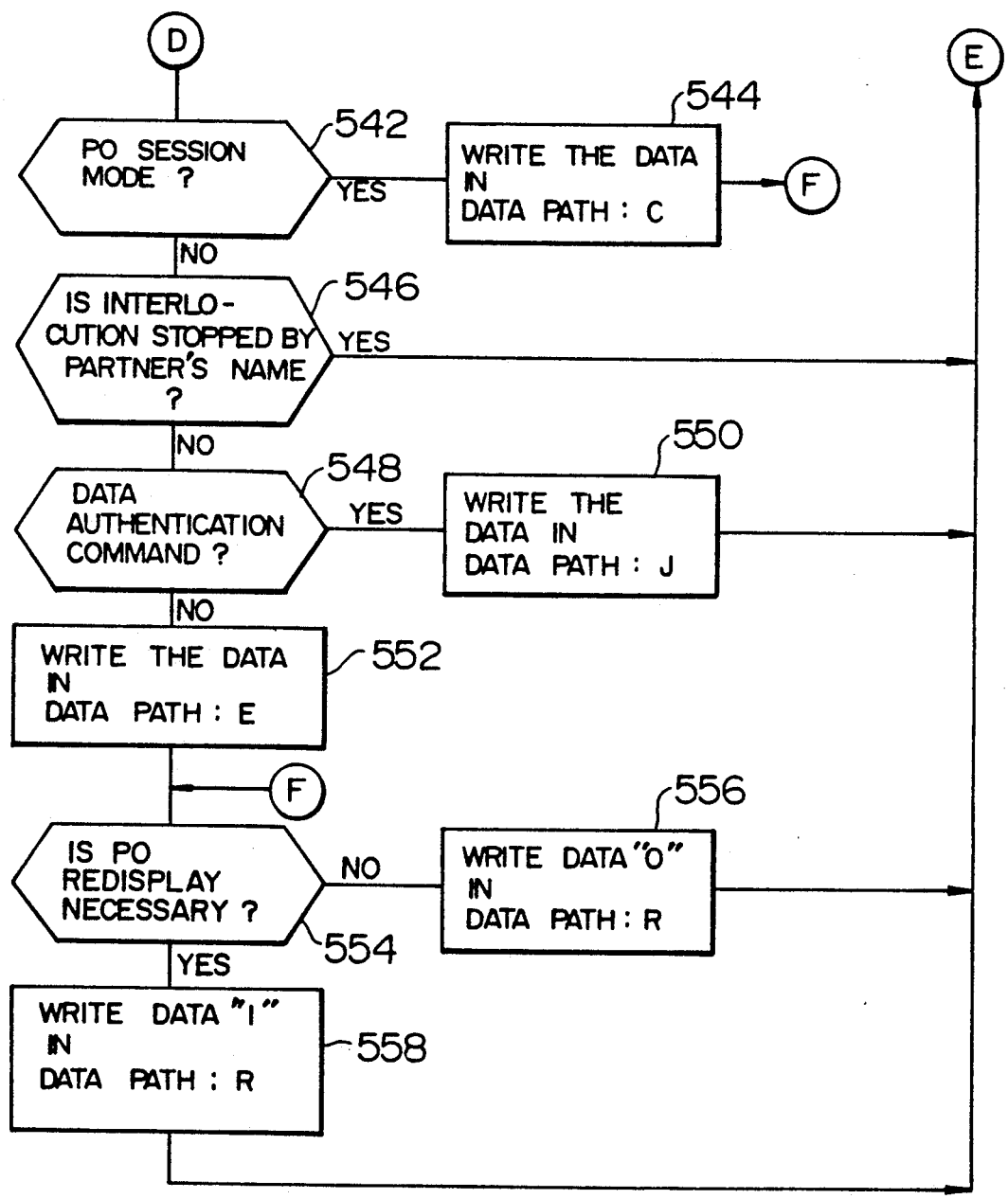

FIGS. 14A and 14B show flows of processing executed by the virtual input analyzing module 500 which serves for the function of analyzing the incoming data from the virtual input distributing module 300 and the virtual input receiving module 400 for transferring the result of the analysis to the module adapted to perform the subsequent processing. The module 500 receives data from the data path 110A (step 502). When the data represents a CREATE PO command (step 504), the PO is generated on the virtual screen memory (virtual terminal) (step 506), whereon the PO-created mode is established. When the input data is a DELETE PO command (step 510), the PO existing on the virtual terminal is deleted (step 512). At that time, the PO-created mode is released or reset. The procedure for the creation of PO and the deletion of PO will hereinafter be described in detail by referring to FIGS. 21 and 22. When the data of concern is a START PO SESSION command (step 516), it is checked whether the PO-created mode has been established or not (step 518). When the PO-created mode is established, the PO operate mode is set (step 524). Otherwise, the PO is first created (step 520), which is then followed by the setting of the PO operate mode (step 524). When the data under consideration is an END PO SESSION command (step 526), the PO operate mode is released (step 528). Before entering into description of the processing for the succeeding two commands, the term "interlocution" used in connection with this processing will first be elucidated. As described hereinbefore by reference to FIG. 5, the logical communication paths used in the electronic interlocution includes the interlocution control route 70 serving for enabling communication between the interlocution control programs and the interlocution route 80 providing the paths for data distribution to the interlocution object programs. In the following description of the stop and the restart of interlocution, the data transfer at the level of the interlocution route 80 is concerned. Even in that case, the communication between the interlocution control programs such as the PO control data interchange performed independent of the interlocution object program is carried out. Now, let's turn back to the description by reference to FIG. 14A. When the data in question is an END INTERLOCUTION command (step 530), the name or ID of the issuer of this command is registered (step 532) and an interlocution stop mode is set (step 534). Concerning an interlocution control state management table in which the interlocution stop mode is set, description will be made later on. In case the input data is a RESTART INTERLOCUTION command (step 536), the ID of the issuer of the interlocution stop command registered previously is deleted (step 538), whereon the interlocution stop mode is canceled (step 540). When the interlocution control is in the PO SESSION mode (step 542 in FIG. 14B), the data of concern is placed in the data path 110C for transferring the data to the PO operate module 600 destined to operate the PO (step 544). On the other hand, in the case of the interlocution stop mode set by the partner (step 546), the data of concern is neglected, because only the transfer of the data at the level of the interlocution control, i.e. transfer of the data for the PO session, is performed. Unless in the interlocution stop mode, it is checked whether the data of concern is a data authentication command or not (step 548). If so, the data is placed in the data path 110J for activating the data authentication module (step 550). When the data represents none of the commands mentioned above, the data is placed in the data path 110E (step 552) to be transferred to the interlocution object program 120. In case the data under consideration is placed in the data path 110E or 110C, there may arise the necessity of redisplaying the PO for the reason that the display of the PO may be destroyed as a result of operation of the interlocution object program because the PO is realized independent of the interlocution object program. In such cases, display of the PO must be restored as rapidly as possible without giving trouble to the interlocutor. Accordingly, in the case of the instant module, a decision is made as to the necessity for the redisplay of the PO in conjunction with the data processing (step 554). When it is unnecessary, data "0" is placed in the data path 110R (step 556). Otherwise, data "1" is placed in the data path 110R (step 558).

Figure 15:
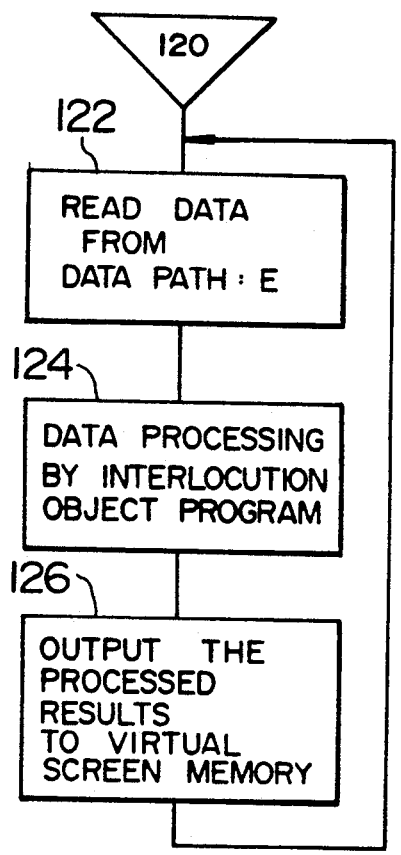
FIG. 15 is a flow chart for illustrating an input/output processing procedure performed by an interlocution object program (120)

FIG. 15 shows a flow of input/output processing for the interlocution object program 120. This program module serves to fetch the data from the data path 110E (step 122), perform the data processing by using the interlocution object program (step 124) and output the result of the processing to the logical or virtual screen memory corresponding to the instant program module (step 126). The processing for the interlocution object represents the inherent function of the interlocution object program. When the program is, for example, a document edit program, the processing is editing of document. When it is a table edit or calculate program, the processing is edition of table or calculation. When it is a data store and retrieve program, the processing is storage and retrieval of data.

Figure 16:
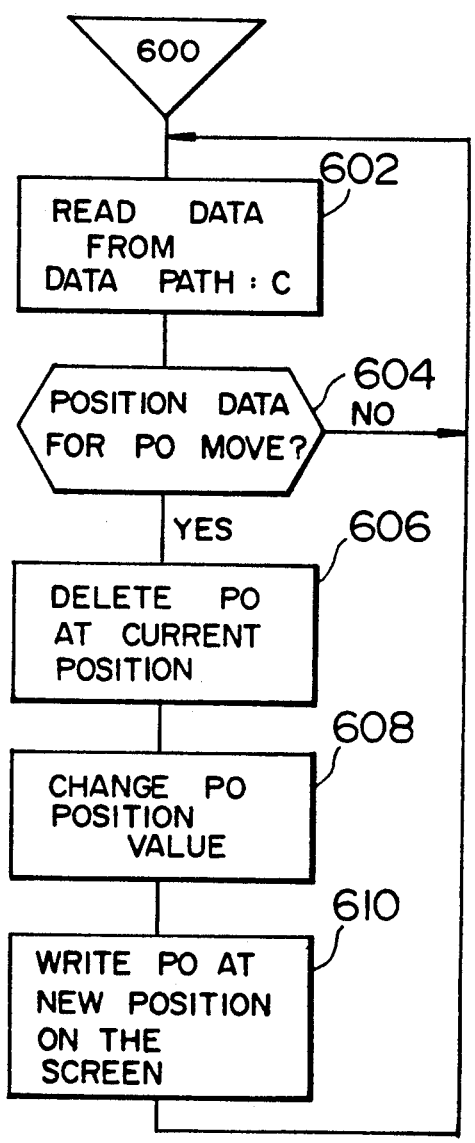
FIG. 16 is a flow chart for illustrating a processing flow in a pointing object (PO) operation module (600)

FIG. 16 shows a processing flow performed by the pointing object (PO) operation module 600. This module fetches the data from the data path 110C (step 602). When the fetched data represents the position data for the PO move (step 604), the PO displayed at the current position is first deleted (step 606), whereon the current position of the PO is updated to a new value given by the fetched data (step 608), being followed by generation of the PO at the updated position. Other data than the position data for the PO move is neglected.

Figure 17:
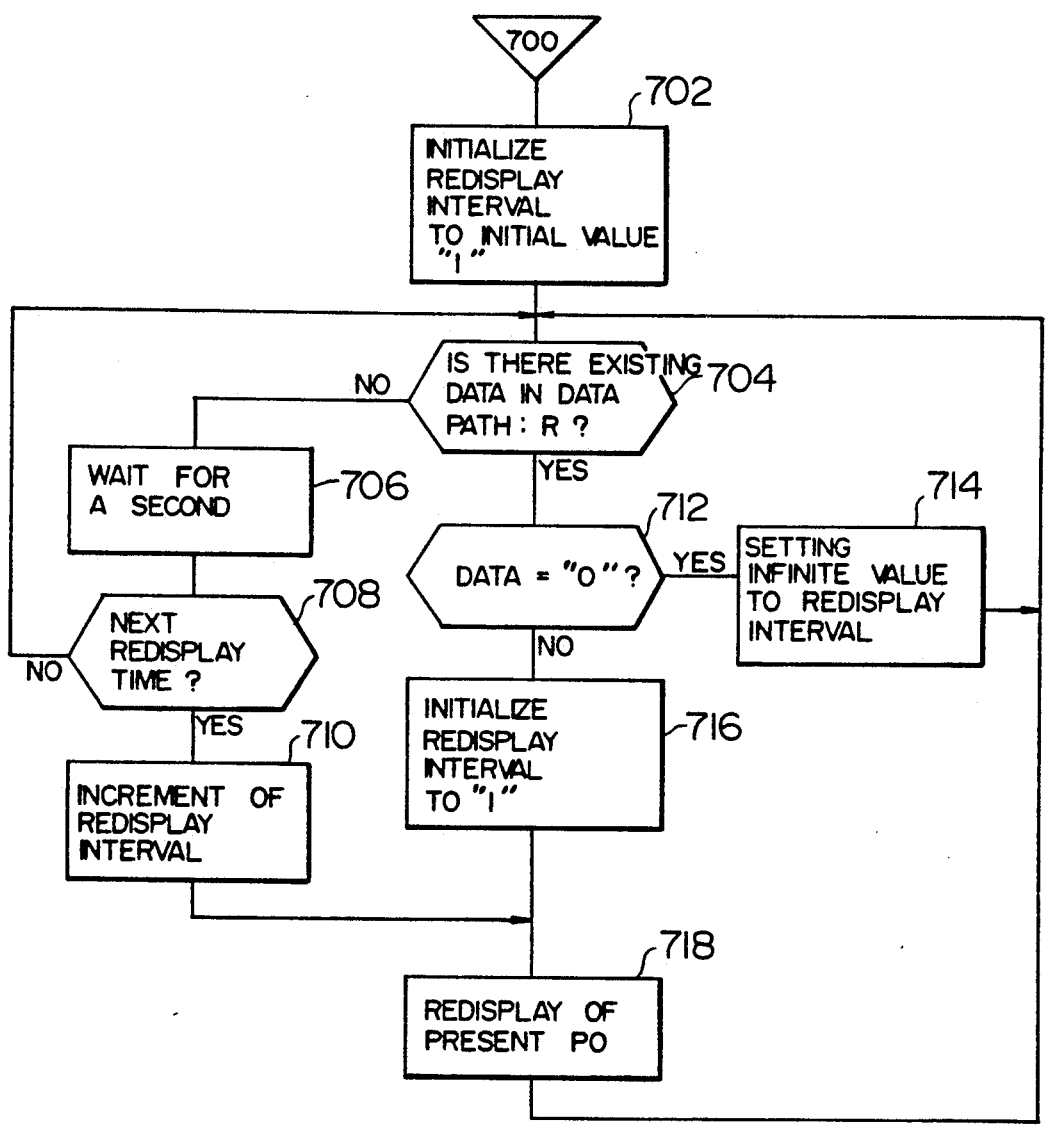
FIG. 17 is a flow chart for illustrating an operation procedure performed by a pointing object (PO) redisplay module (700)

FIG. 17 shows a processing flow executed by the PO redisplay module 700. This module 700 executes repeatedly the PO redisplay processing at a time interval. The time lapsing till a next redisplay is referred to as the redisplay interval. In the case of the illustrated embodiment, the redisplay interval is dynamically changed with a view to realizing a rapid redisplay while sparing the unnecessary redisplay. At first, the initial value of the redisplay interval is set, for example, to 1 (one) second (step 702). It is then checked whether data is placed in the data path 110R, whereon the module waits for data for one second, if the data is absent in the data path 110R (step 706). Unless the time is for the next redisplay upon lapse of one second, the data path 110R is again checked (step 708). Otherwise, the redisplay interval is incremented by 1 (one) (step 710) to execute a redisplay of the PO created already (step 718). On the other hand, when the data is present in the data path (step 704) and when it is "0" (step 712), the redisplay interval is set to be infinite (practically to a sufficiently large value) (step 714), since no redisplay is required till arrival of the data "1". In contrast, when the data as found at the step 712 is "1", this means that a situation requiring the redisplay takes place. Accordingly, the redisplay interval is initialized to "1" (step 716), whereon the redisplay of the present PO is executed (step 718). In this way, the redisplay of PO is realized rapidly when it is required, while avoiding the unnecessary redisplay.

Now, description will be turned to data formats, the interlocution management table stored in the interlocution control area 115 and the PO management table which are adopted for realizing the functions described above.

Figure 18:
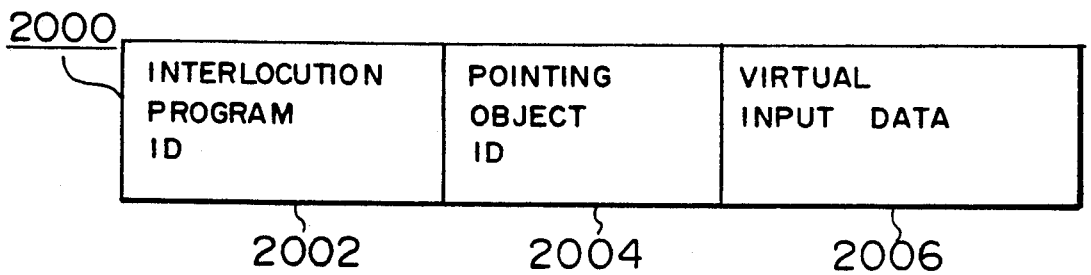
FIG. 18 is a diagram for illustrating data formats used by the interlocution control program (100)

FIG. 18 shows a data format 2000 used internally of the interlocution control program 100. With a view to imparting a general-purpose nature to the interlocution control program 100, it is taught by the invention that the data placed in the data path 110T shown in FIG. 9 is of the conventional format generated by the various devices (the keyboard 3, the pointing device 4 and the like) connected to the computer or data processor. Similarly, in order to make it possible to utilize the general application software used heretofore as the interlocution object program 120, the data placed in the data path 110E to be transferred to the interlocution object program 120 is also of the conventional data format. Naturally, the conventional data format is adopted for the data issued to the logical screen memory 150 by the interlocution object program 120, the PO operation module 600, the PO redisplay module 700 and the authentication module 800. More specifically, the data format shown in FIG. 18 and generally denoted by 2000 is used as the data format for the data which the virtual input distributing module 300 sends to the partner's interlocution control program and which is placed in the data path 110A, the data which the virtual input receiving module 400 receives from the partner's interlocution control program, which is placed in the data path 110A, the data which the virtual input analyzing module 500 fetches from the data path 110A and which is placed in the data path 110E, the data path 110C, the data path 110R and the data path 110J, the data which the interlocution object program 120 fetches from the data 110E, the data which the PO operation module 600 fetches from the data path 110C, the data which the PO redisplay module 700 fetches from the data path 110R and the data which the authentication module 800 fetches from the data path 110J, respectively. The illustrated data format is constituted by an interlocution control program identifier (ID) 2002, a pointing object (PO) identifier (ID) 2004 and virtual input data 2006. The interlocution program ID 200 specifies the interlocution control program which generated the associated data and can be expressed by combining together the network address of the computer (data processor) in which the interlocution partner's program exists and the program name or abbreviated names thereof. The identifier 200 is used when the logical communication path or route 80 is to be disconnected, when only the input through the virtual input distributing module 300 is to be received and when the input received from the partner's interlocution control program through the virtual input receiving module 400 is to be neglected. The PO identifier 2004 specifies the PO subjected to the PO operation when the associated data is for the PO operation. The virtual input data 2006 is of the conventional type generated by the input devices. However, when the data is not for the interlocution object program 120 but for the interlocution control, such as creation (generation) of PO, by way of example, it is a matter of course that the data can not necessarily be understood by the interlocution object program 120.

Figure 19:
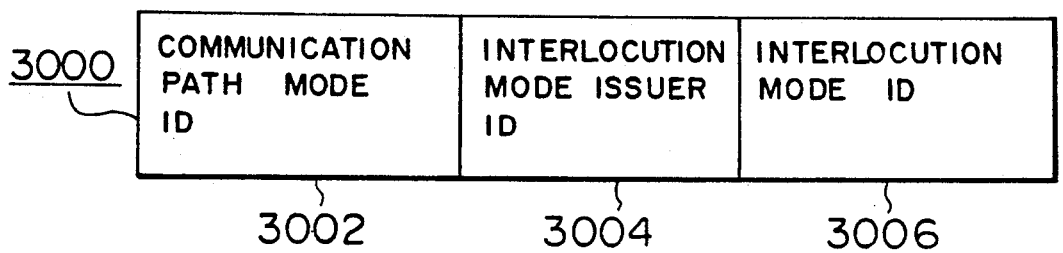
FIG. 19 is a diagram for illustrating an interlocution management table for managing the interlocution states and used for controlling the interlocution.

FIG. 19 shows the contents of the interlocution management table to be stored in the interlocation control area 115 for managing the interlocution control state in the interlocution control program 100. The table contains the information concerning the establishment and setting of the communication path. More specifically, the table generally denoted by 3000 contains a communication path mode identifier (ID) 3002, an interlocution mode issuer identifier (ID) 3004 and an interlocution mode identifier 3006. The communication path mode identifier 3002 discriminatively identifies whether the communication path has been established or not. The interlocution mode issuer identifier 3004 identifies the interlocution control program which has issued the request for disconnection or reestablishment of the communication path. The interlocution mode identifier 3006 identifies that the communication path is being disconnected or reestablished.

Figure 20:
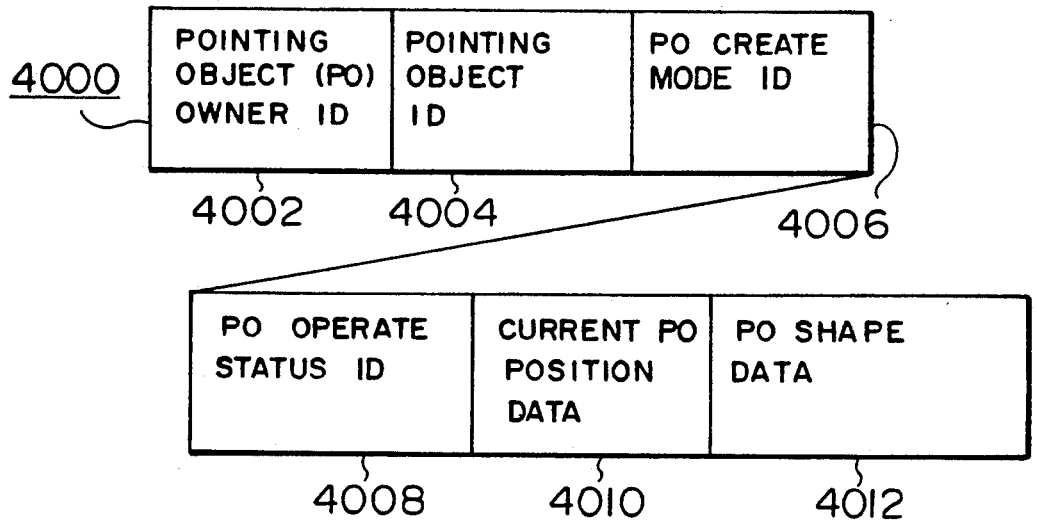
FIG. 20 is a diagram for illustrating a pointing object management table used for operating the pointing objects.

FIG. 20 shows the contents in the PO management table used for managing the PO operation status. This table 4000 handles information concerning the PO operation mode and the data utilized in connection with the display of the PO. The table generally denoted by 4000 contains a pointing object (PO) owner identifier 4002, a pointing object identifier 4004, a PO create mode identifier 4006, a PO operation state identifier 4008, a PO current position data 4010 and a PO shape data 4012. The PO owner identifier 4002 is used for identifying the interlocution control program which created the pointing object of concern. The PO identifier specifies the PO of concern among the POs used by the PO owner. The PO create mode identifier 4006 is used for discriminating whether or not the PO of concern has already been created (generated) on the virtual terminal 150. The PO operation mode identifier 4008 discriminates whether the interlocution control program is in the PO operation state or not. The current position data 4010 represents the position at which the PO of concern is displayed on the virtual terminal 150. The PO shape data 4012 represents the information concerning the shape and the color in which the PO is to be displayed on the virtual terminal 150.

Concerning the creation and the deletion of the PO, description will be made on the basis of the contents of the PO management table mentioned above.

Figure 21:
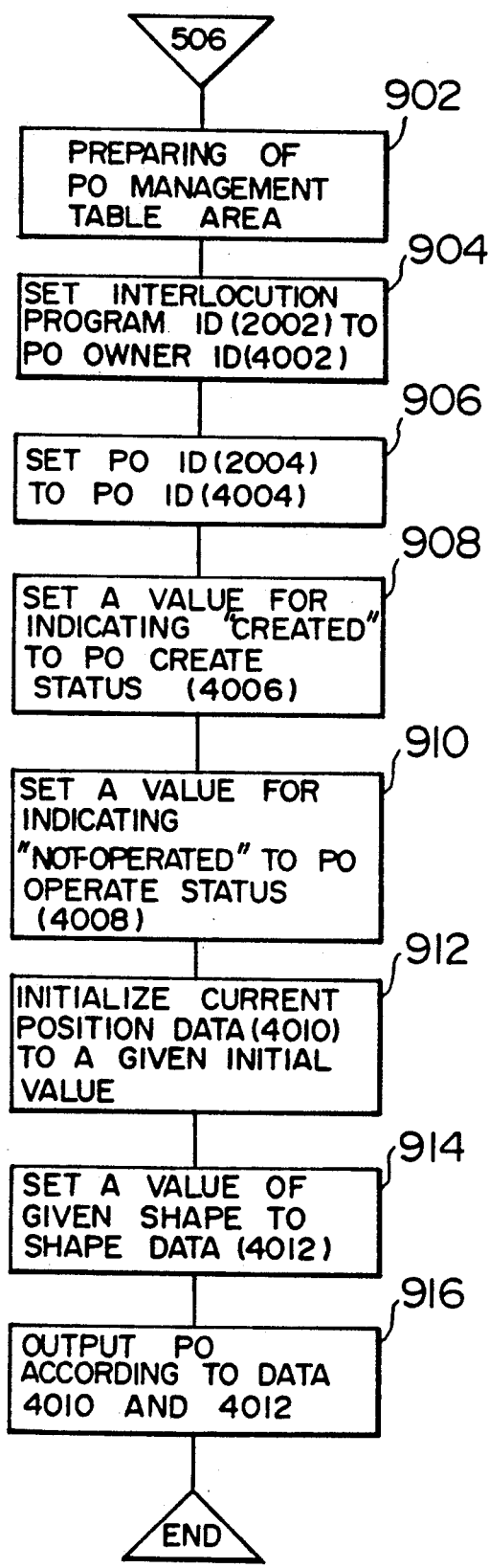
FIG. 21 is a flow chart for illustrating a processing for creating the pointing object.

FIG. 21 shows a flow of processing in the pointing object (PO) creating routine (the step 506 in FIG. 14A). The data commanding the creation of PO contains the information concerning the initial display position, the shape and the like of the PO. For creating newly a pointing object or PO, an area for preparing the PO management table is first reserved in the control area 115 (step 902). Next, the value of the interlocution program identifier 2002 is set to the PO owner identifier 4002 (step 904). The value of the PO identifier 2004 is set to the PO identifier 4004 (step 906). A value indicating "created" is set to the PO create mode identifier 4006 (step 908). A value indicating "not-operated" is set to the PO create state identifier 4006 (step 910). The current position data 4010 is then initialized to a given initial value (step 912). Next, a value indicating a given shape is set to the shape data 4012 (step 914). Finally, the pointing object (PO) is displayed on the logical screen memory 150 in the shape indicated by the PO shape data 4012 at the position indicated by the PO current position data 4010 (step 916).

Figure 22:
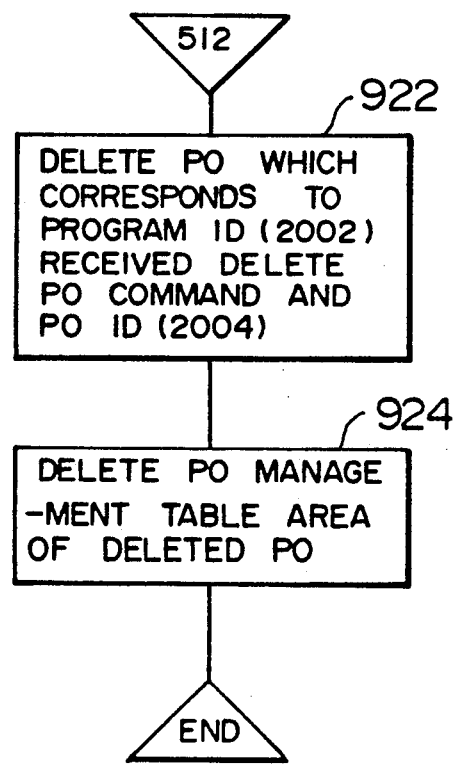
FIG. 22 is a flow chart for illustrating a processing for deleting the pointing object.

FIG. 22 shows a flow of processing in the PO delete routine (step 512 in FIG. 14A). For deletion of PO, the display of the PO is erased for which the PO owner identifier 4002 coincides with the interlocution control program identifier 2002 while the PO identifier 4004 coincides with the PO identifier 2004 (step 922), and the PO management table area for the deleted PO is deleted (step 924).

In conjunction with FIG. 2, operation for allowing both interlocutors to utilize the data owned only by one interlocutor has been described. It is the function of the interlocution object program 120 to fetch data externally as the object for the interlocution. However, when both interlocution object programs are operated interlockingly in the state where the data of concern is owned only by one interlocutor, there may arise an undesirable situation in the data processor (computer) of the other interlocutor. In order to evade such situation, there are adopted in the case of the illustrated embodiment such measures which stop temporarily the interlocked or joint operation between the interlocution object programs 120, when operation is performed in the state where the environments of both interlocutors do not coincide with each other. FIGS. 23A to 23E are diagrams for illustrating in detail the function for stopping temporarily the joint operation between both interlocution object programs. Referring to these Figures, description will first be made of a method of fetching data externally by the interlocution object program. The external data fetching method includes two steps. At the first step, the data of concern is stored in the data interchange file in the format which the interlocution object program can understand. At the second step, the data is actually fetched. As can be seen, at the first step, it is necessary that the data of concern does exist. At the second step, however, it is sufficient that the data interchange file is present. According to the method adopted in the illustrated embodiment, the logical communication route or path 80 is temporally disconnected, wherein the processing of the first step is performed by the interlocution object program (e.g. 120A) of the work station in which the data of concern exists. The data interchange file prepared as the result of the first step processing is transferred between the interlocution control programs 100A and 100B by way of the interlocution control route 70. At the time when the data interchange files of the same content are prepared availably in both the work stations, the logical communication path is reestablished, which is then followed by the interlocking of the interlocution object programs 120A and 120B of both the work stations. FIGS. 23A to 23E are conceptual views similar to FIG. 5. It is now assumed that the data of concern exists in the environment of the work station A and that the user of the work station A issues the interlocution stop command C1 (FIG. 23A). As a result, the logical communication path 80 assumes the state of being disconnected (FIG. 23B). In the case of the illustrated embodiment, disconnection of the logical communication path (route) 80 by the one work station A makes it impossible to transfer the data to the interlocution object program 120 in the other work station B. In the work station A, a data interchange file (i.e. file for data interchange) 160A is prepared from the data of concern in accordance with a data interchange file preparation command C2. Referring to FIG. 23C, a data interchange file transfer command C3 issued by the work station A is transmitted to the partner's interlocution control program 100B by way of the interlocution control route or path 70. The transfer of the data interchange file is carried out by way of the interlocution control route 70, whereby a data interchange file 160B having the same content as the data interchange file 160 is prepared in the work station B, as shown in FIG. 23D. Subsequently, the interlocution path or route 80 is reestablished, as shown in FIG. 23E. Thus, in the state where the environments of both the work stations coincide with each other, the command Cn for making use of the data interchange files 160A and 160B can be effectively processed simultaneously in both the work stations.

Figure 24:
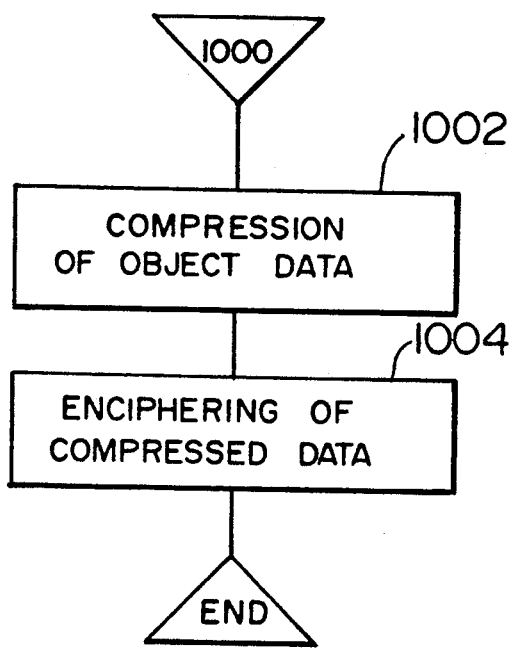
FIG. 24 is a flow chart for illustrating the processing for generating authentication data.

Now, description will be turned to a method of authenticating the data or document created through the interlocution. In the first place, the phrases "regular authentication data" and "temporary authentication data" used in the following description will be elucidated and defined. When data X is to be "authentication data" prepared by an authenticator for a given data X, this requires that a function f for generating new data from the given data D and the given data X does exist and is unique to the data D and X. In other words, if f(D, X)=f(D', X'), then D=D' and X=X'. As such function f, there is adopted in the case of the illustrated embodiment a combination of a public key enciphering and a data compression enciphering. According to the public key enciphering scheme, a secret enciphering key e and a public enciphering key d are used. Let's represent a function for the data compression by h. FIG. 24 shows a flow chart for illustrating the processing for generating the authentication data. Referring to the Figure, the data D is first compressed to an appropriate size by the data compression function h (step 1002) and subsequently enciphered by the enciphering key e to become the authentication data. The phrase "regular authentication data" means the authentication data showing that given data is regularly authenticated, while the phrase "temporary authentication data" means such authentication data which shows a promise of sending its own regular authentication data upon reception of the partner's regular authentication data.

Figure 25:
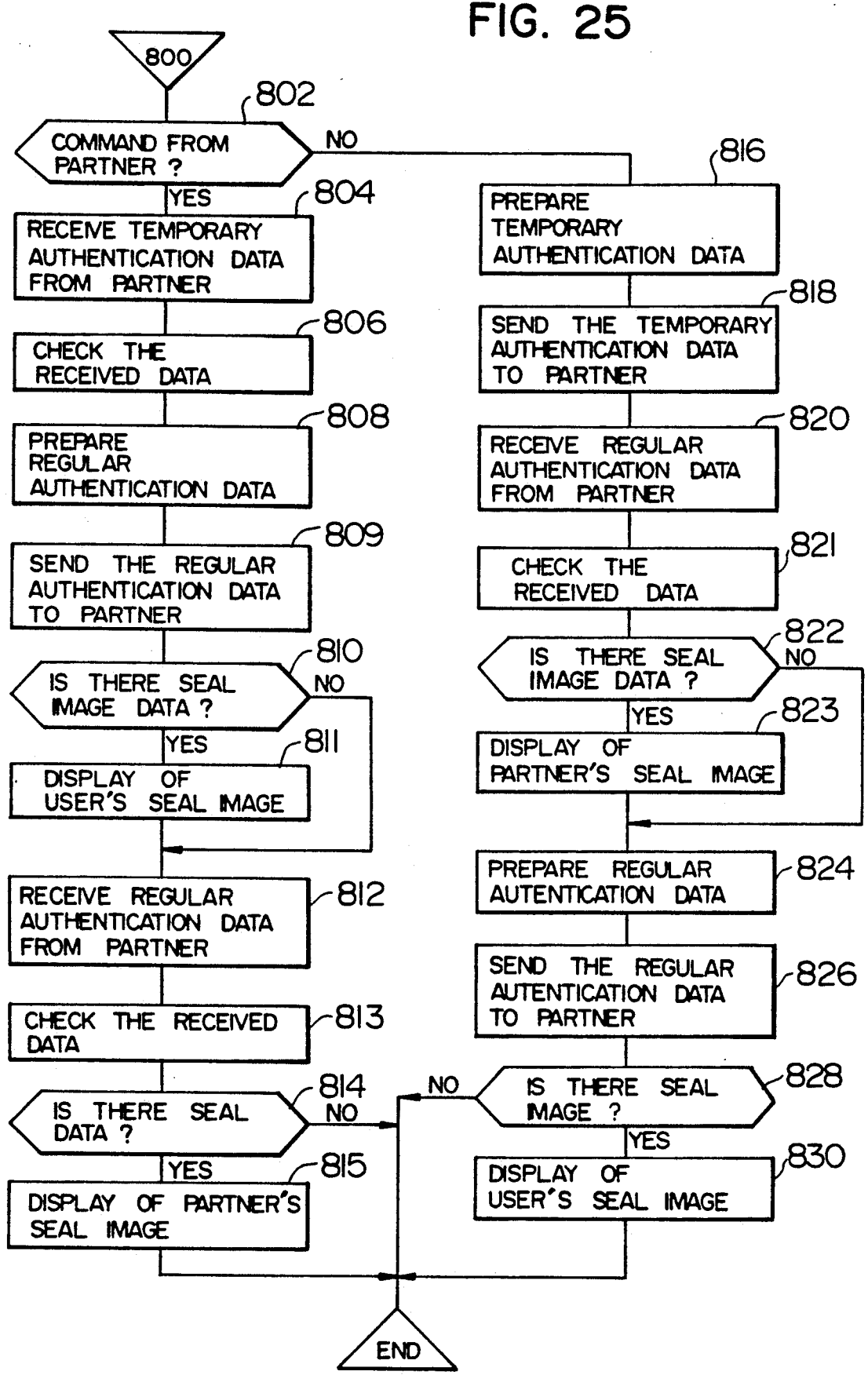
FIG. 25 is a flow chart for illustrating an operation procedure performed by an authentication module (800)

FIG. 25 is a flow chart for illustrating a processing executed by the authentication module 800. Referring to the figure, a data authentication command including data indicating a location of interlocution object data being processed by the interlocution object program 120 is fetched, whereupon it is confirmed and guaranteed that the data being processed currently by both interlocutors coincide with each other. In the following, a method of interchanging the authentication data referred to as the temporal digital signature is first elucidated, being followed by explanation of a method of confirming the correctness. Parenthetically, a temporal digital signature technique is described in U.S. application Ser. No. 180,050 filed Apr. 11, 1988 (corresponding to Japanese Patent Application Nos. 60-193735 and 61-96705). Turning back to FIG. 25, upon reception of a command from the path 110J, the module 800 checks on the basis of the interlocution control program identifier 2002 whether the command is from the partner work station or not (step 802). When the issuer of the command of concern is the partner interlocutor, temporary authentication data is received from the partner (step 804), whereon the correctness of the received data is checked (step 806). Subsequently, its own regular authentication data is prepared (step 808) and sent to the partner together with the own seal image data, if necessary (step 809). When the seal image data is available (step 810), this data is displayed on its own interlocution object data or document (step 811). Subsequently, the partner's regular authentication data and, if necessary, the partner's seal image data are received (step 812) and checked as to the correctness (step 813). Upon reception of the partner's seal image data (step 814), this data is also displayed on its own interlocution object data or document (step 815). On the other hand, when the issuer of the data authentication command is the user (not the partner), its own temporary authentication data is prepared (step 816) and sent to the partner (step 818). Subsequently, the regular authentication data and the seal image data, if necessary, are received from the partner (step 820) and the correctness of the data is checked (step 821). Upon reception of the partner's seal image data (step 822), this data is displayed on its own interlocution object data or document (step 823). Next, its own regular authentication data is prepared (step 824) and sent to the partner together with its own seal image data, if necessary (step 826). When there is available the seal image data, this data is displayed on its own interlocution object data or document (step 830). It goes without saying that the preparation, transmission and reception and the check of the temporary authentication data as well as the transmission and reception and the display of the seal image can be spared with a view to simplifying the processing.

Figure 26:
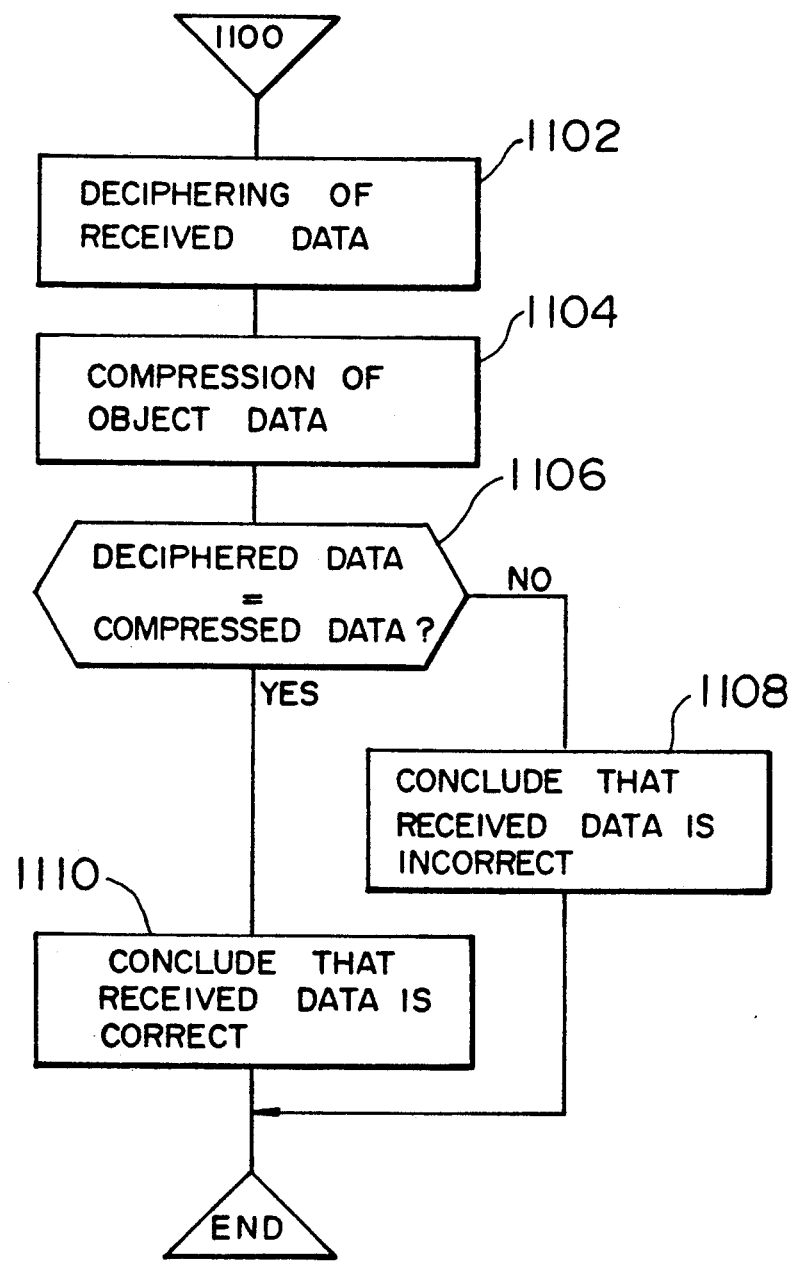
FIG. 26 is a flow chart for illustrating a processing for confirming correctness of the authentication data.

FIG. 26 is a flow chart for illustrating a method of checking the correctness of the authentication data as received (which corresponds to the steps 806 and 821 in FIG. 25). In conjunction with the electronic interlocution according to the invention, it should be noted that the processing illustrated in FIG. 26 is for the purpose of checking or confirming the identity between the interlocution object data, such as documents viewed by both interlocutors, respectively. The authentication data is prepared by compressing the object data by using a compression function and subsequently enciphering by using the secret enciphering key. The authentication data as received is deciphered by using a public deciphering key (step 1102), as the result of which there is obtained the partner's interlocution object data in the state compressed by the compression function (step 1104). Subsequently, its own interlocution object data is compressed by using the compression function. Coincidence between the compressed data and the deciphered data (step 1106) means that the received authentication data is correct (step 1110), while a discrepancy therebetween means that the received authentication data is incorrect (step 1108).

Figure 27:
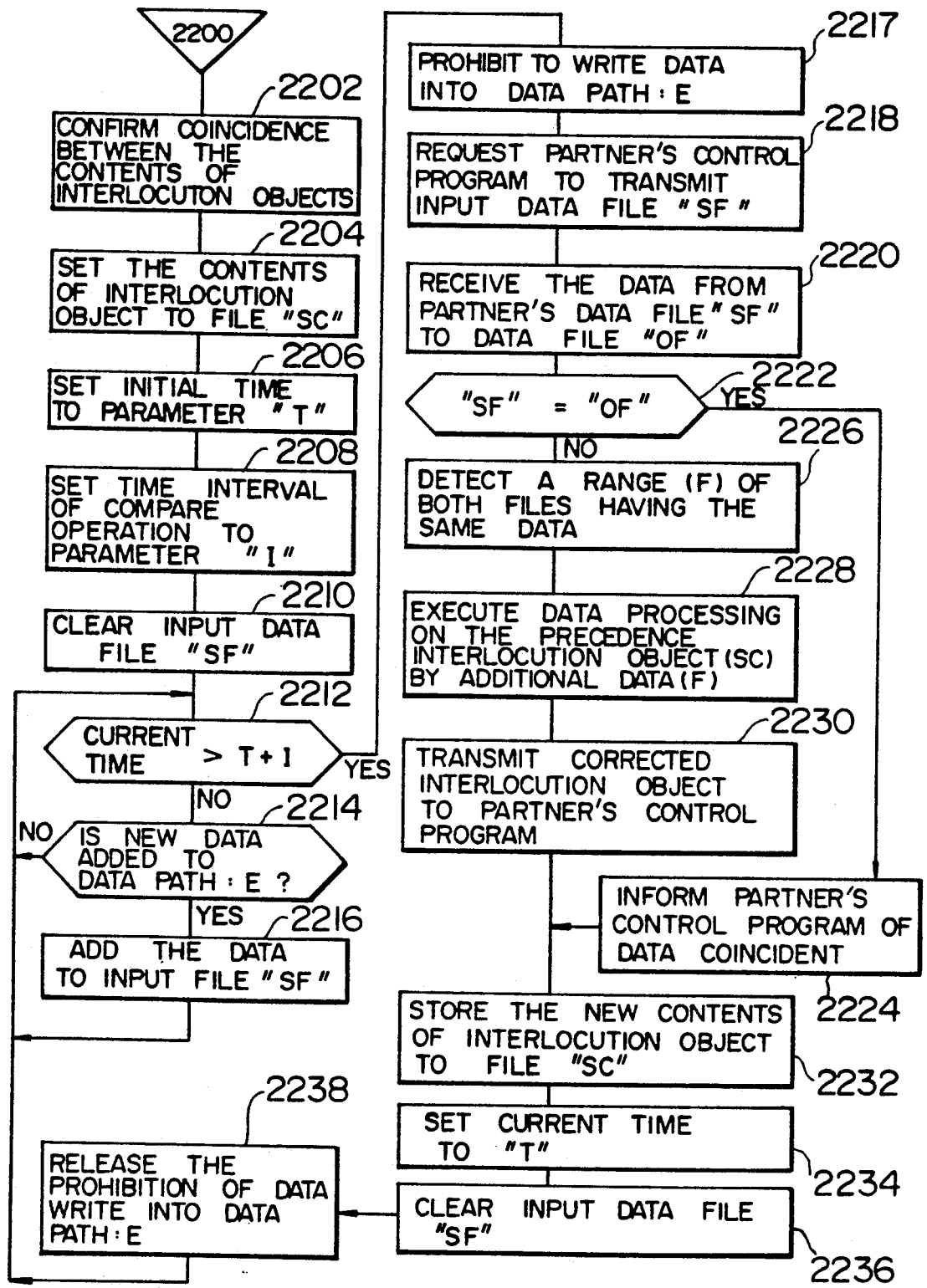
FIG. 27 is a flow chart for illustrating processings for comparison and for restoring the identity upon detection of a difference as performed in a master work station.
Figure 28:
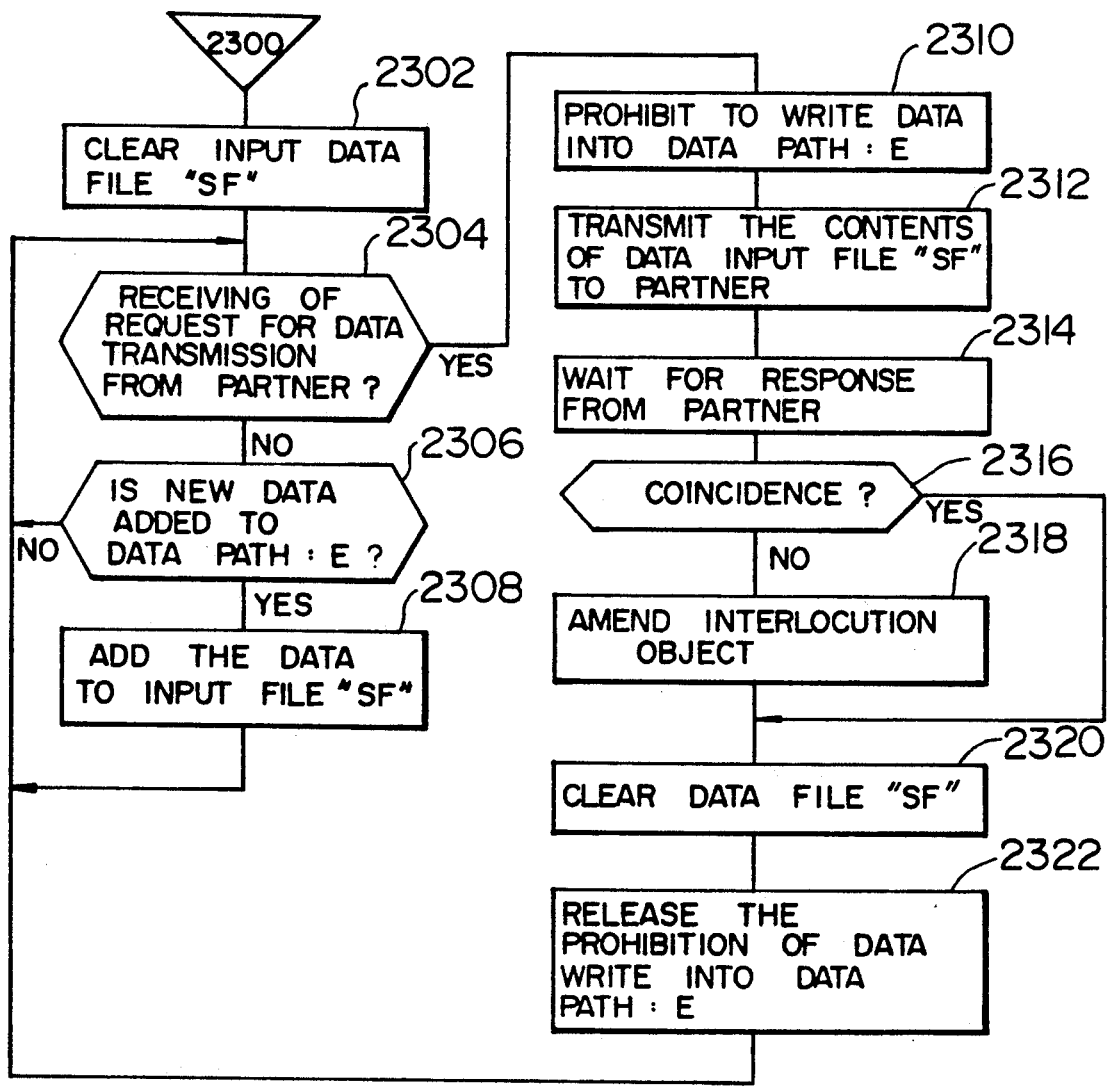
FIG. 28 is a flow chart for illustrating the operation performed by the interlocution control program of a partner work station for restoring the content of the interlocution object.

Next referring to FIGS. 28 and 29, description is directed to a processing module for comparing the contents of the interlocution objects between the two stations, checking the coincidence or discrepancy between the contents and restoring the state of coincidence. This module is an option module activated, as occasion requires, internally of the interlocution control program. In the case of the instant embodiment, one of the two work stations interlocked for interlocution is imparted with the leadership (initiative) in performing the comparison of the contents between the interlocution objects. FIG. 27 shows a flow chart for illustrating the processing performed by the work station (e.g. station A) imparted with the leadership, and FIG. 28 shows a flow chart for illustrating the operation performed by the interlocution control program of the partner work station (station B). First, referring to FIG. 27, upon start of the interlocution it is confirmed that the contents of the interlocution objects in both work station are in coincidence with each other (step 2202). The term "contents" means sets of data to be processed by the interlocution object programs 120A and 120B, respectively. As the initialization steps, the contents of interlocution object are set to a file area SC (step 2204), the initial time is set to a parameter T (step 2206), the time interval at which the operation for comparing the contents of the interlocution objects is activated is set to a parameter I (step 2208), and a file SF is cleared (step 2210). Unless the time I has elapsed from the time point T (step 2212), data placed in the data path 110E (step 2214) is added to the input file SF (step 2216). In this manner, the data transferred to the interlocution object program (1000) during a period from the time point T to the current time is stored in the file SF. On the other hand, when the time I has elapsed from the time point T (step 2212), data is temporarily prohibited from being written into the data path 110E (step 2217), whereon there is issued to the partner's interlocution control program a request for the transfer of the partner's file SF (step 2218). The file SF prepared by the partner's interlocution control program is received at the file area OF (step 2220). When coincidence is found between the contents of the files SF and OF (step 2222), information of the coincidence is sent to the partner's control program (step 2224). Discrepancy existing between the contents of concern means that difference has taken place in the data processed by the two interlocution object program. In this case, the data stored in the files SF and OF on a time-serial basis is checked starting from the initial data, whereby series of data which coincide with each other are stored in a file F (step 2226). Subsequently, the interlocution object program 120A is caused to perform the processing by using the data stored in the file F on the basis of the data stored in the file SC, the result of which is set as the corrected current contents of the interlocution object (step 228). Next, information concerning the detection of the discrepancy in the contents is transmitted to the partner's interlocution control program together with the corrected contents of the interlocution object prepared at the step 2228 (step 2230). For the comparison at the next time, the corrected contents of the interlocution object are stored in the file SC (step 2232). Now, the current time is set to the parameter T (step 2234). The file SF is cleared (step 2236), and the prohibition of the data write into the data path 110E is released (step 2238), whereupon a return is made to the step 2212. In this manner, the new input data is stored in the data path 110E until the time point T+I.

Referring to FIG. 28, description will be made of operation of the interlocution control program 100B of the partner station B. At the time point when the interlocution is started, the input data file SF is cleared (step 2302). So long as the request for transfer of the file SF is not received from the partner's interlocution control program 100A (step 2304), data written in the data path 110E (step 2306) is added to the input data file SF (step 2308). In this manner, the data transferred to the interlocution object program 120B is stored in the input data file SF. Upon reception of the request for transfer of the file SF from the partner's interlocution control program 100A (step 2304), the writing of data in the data path 110E is temporarily prohibited (2310), whereon the content of the data input file SF is transmitted to the partner's interlocution control program (step 2312), and the response from the partner concerning the result of comparison is waited for (step 2314). Upon reception of the information of coincidence between the contents of both the interlocution objects (step 2316), the content of the interlocution object is newly set as the current content of the interlocution object (step 2318). Subsequently, the input data file SF is cleared (step 2320), while prohibition of writing in the data path 110E is released for enabling the next comparison (step 2322). Again, the input data is stored in the data path 110E until the comparison is performed. In this way, by using a relatively small amount of data issued to the interlocution object program, it is possible to detect a difference in the contents of the interlocution objects.

With the work station system elucidated above, the user may conduct interlocution or conference with other user(s) in the following manner.

When the user turns on the power supply to the work station 1A so as to be in time for the conference, there is displayed on the screen the function select menu, from which the user can select the icon meaning the conference (or interlocution).

As a result, the interlocution control menu 70 described hereinbefore by reference to FIG. 10A is displayed within the interlocution control window A60, and the interlocution control program 100A is activated, whereby the input devices 3 and 4 are placed under the control of the input virtualizing module. Other members than the host user select the interlocution control menu and then select the participation 71A, whereupon the virtual input receiving module 400 is set to the state to wait for the request for establishment of the interlocution control route or path 70. The host user selects the member designation 71B and then specifies the partner(s), whereby the request for establishment of the interlocution control route is issued to the partner work station(s). Thus, the interlocution control route 70 is established between the work stations. When more than two members, inclusive, participate in the conference, the partner members are designated sequentially. Upon complete establishment of the control route or path 70, the frame color or background color of the control window A60 is changed. Thus, the user can recognize that the interlocution is ready.

When the host user selects from the material or document list 73 one document for the interlocution which is to be distributed to the member(s), there makes appearance within the interlocution control window A60 the command menu shown in FIG. 10D. Further, an application program corresponding to the specified document is activated. Owing to the function of this application program, a part of the content of the material or document is displayed within a new window on the display screen. When the host user selects the distribution command 73A from the command menu, the data constituting the document mentioned above is transmitted to the other work station(s). At that time, the distribution of the document is memorized in the table adapted to manage the menu 70, whereby the color of the icon indicating the document distributed can be changed when the menu 70 is displayed next time. In this state, the host user may input the joint use command. Then, the document display window is set to the interlocution window mode with the color of that window being changed so as to be discriminated from the other local windows. Since the joint use command is transmitted to the partner work station(s), the document window is set to the interlocution window mode also in the partner work station(s).

When the user creates a document in one window on the display screen for the joint use, the created document is then associated with the interlocution control window A60 or B60 to be placed under the control of the interlocution control program. Thereafter, the operation described above is performed. Since the control menu 70 corresponds to one interlocution control program, a plurality of documents or materials may simultaneously be used as the objects for the interlocution provided that they are registered in the document list 73.

When the joint use stop command is issued concerning the document or material which has already been the object for interlocution, the joint use mode is released, whereupon the work station can be restored to the individual use mode. At that time, the color of the window displaying the material and that of the material representing an icon are changed to identify the individual use mode discriminatively from the joint use mode.

When the leave command 71C is inputted in one of the work stations in the course of the conference or interlocution, the interlocution control route to the one work station is deleted. In case the interlocution is to be ended, the host user inputs the material recovery command 73D for the specified material or document. This command 73D is transmitted to the other work station(s), whereby the distributed document can be deleted from the registration. Upon inputting of the end command 72A, all the interlocution control paths between or among the stations make disappearance.

By providing preparatorily a plurality of sets of the control menus and the interlocution control programs in each of the work station according to the teachings of the invention, the plural interlocution control programs may be caused to run simultaneously in one station so that one user can participate simultaneously in plural conferences realized by different combinations of the work stations, respectively.

As will be appreciated from the foregoing description, the interlocution communication system or joint information processing system provided by the present invention allows a variety of programs used currently to run on a plurality of work stations (computers) in the similar manner. Further, by using the system together with the telephones, various information can be instantly processed by making use of the voice and data between the distant locations while viewing the information. The result of the processing can instantly be presented to all the participants.

In the work station imparted with the multiwindow function according to the teaching of the invention, decision as to whether a given one of the windows is to be used for the joint operation with the other work station can be made at any time. Of course, the work station can be used individually or independently and can straightforwardly enter the joint information processing, as occasion requires.

What is claimed is:

1. An interlocution communication method carried out in a communication system including a plurality of stations connected to a communication network, wherein each of said stations has a multi-window control function for creating a plurality of windows on a display screen including an interlocution control window for inputting commands, said method comprising:

a step of establishing a control communication route between interlocution control programs running on first and second stations by inputting predetermined commands through at least one of said interlocution control windows created in the display screen of said first and second stations;

a step of creating a first window for working a first application program in the display screen of said first station and creating a second window for working a second application program in the display screen of said second station, said first and second application programs having the same function to produce the same processing results in response to the same input;

a step of establishing on said control communication route a logical communication path for interlocking said first window of said first station and said second window of said second station by sending a first control command from the interlocution control program of said first station to the interlocution control program of said second station by way of said control communication route when an instruction to operate said first window in an interlocution mode is inputted through said interlocution control window of said first station;

a step of inputting data or a command for said first or second application program to said first or second window at one of said first and second stations;

a step of intercepting said input data or command by one of said interlocution control programs in said one of said first and second stations at which said input data or command is inputted;

a step of supplying said input data or command to one of said first and second application programs by said one interlocution control program which has intercepted said input data or command to perform a data processing for said input data or command;

a step of checking by said one interlocution control program whether or not a logical communication path exists for said first or said second window to which said input data or command has been inputted and transmitting by said one interlocution control program said input data or command from said of said first and second stations to the other one of said first and second stations through said control communication route using the logical communication path, when said logical communication path exists;

a step of processing by the other one of said first and second application programs in said other one of said first and second stations said input data or command transmitted from said one of said first and second stations, thereby to display the same output of data processing in said first and second windows;

repeating said steps of supplying, checking, transmitting and processing for each input data or command inputted at said inputting step; and a step of disconnecting said logical communication path interlocking said first and second windows by sending a second control command from one of said two interlocution control programs to the other through said control communication route when an instruction to operate said first or second window in a local mode is inputted through one of said interlocution control windows.

2. An interlocution communication method according to claim 1, further comprising:

a step of establishing on said control communication path a second logical communication path for interlocking a third window created in the display screen of said first station to work a third application program and a fourth window created in the display screen of said second station to work a fourth application program by sending a control command inputted through said interlocution control window of one of said first and second stations from one of said interlocution control programs of said first and second stations to the other one of said first and second stations by way of said control communication route;

a step of inputting data or a command for said third or fourth application program to said third or fourth window at either one of said first and second stations;

a step of processing said input data or command by one of said third and fourth application programs in said one of said first and second stations at which said input data or command is inputted;

a step of transmitting said input data or command by one of said interlocution control programs from said one of first and second stations to the other by way of said control communication route using said second logical communication path if said second logical communication path exists; and a step of processing said input data or command received from said control communication route, by the other one of said third and fourth application programs at said other one of said first and second stations.

3. An interlocution communication method according to claim 1, further including:

a step of changing a visual state of said first and second windows in said first and second stations, respectively when the logical communication path has been established between said first and second application programs so that a user can discriminatively recognize whether or not said first or second window is cooperating with a window in any one of the other stations.

4. A method of communication carried out in a communication system including a plurality of stations connected to a communication network, each of said stations being provided with a plurality of application programs and an interlocution control program and having a multi-window function for creating a plurality of windows on a display screen, said method comprising:

a step of creating control windows in display screens of first and second stations respectively, each of said control windows including a command menu of control commands for said interlocution control program;

a step of establishing on said communication network a communication path for effecting communication between said interlocution control programs of said first and second stations when a first control command is inputted through the command menu displayed in one of the control windows of said first and second stations;

a step of creating in each display screen of said first and second stations an interlocution window for working therein one of said application programs;

a step of logically establishing on said communication path an interlocution path for logically connecting a pair of application programs each running in each of said interlocution windows created in said first and second stations when a second control command is inputted through the command menu displayed at one of said first and second stations;

a step of inputting data or a command for said pair of application programs to one of said interlocution windows of either one of said first and second stations;

a step of intercepting said input data or command by said interlocution control program at said one of said first and second stations and supplying said intercepted input data or command to said one application program running in said one of said interlocution windows;

a step of checking by said interlocution control program at said one of said first and second stations whether or not an interlocution path exists in relation to said interlocution window;

a step of transmitting said input data or command from said one of said first and second stations to the other one of said first and second stations by said interlocution control program through said communication path using said interlocution path, when the interlocution path exists; and a step of supplying said one of application programs at the other one of said first and second stations with said data or command received from said communication path by interlocution control program whereby a data processing for said input data or command is performed by said one of application programs in both of said first and second stations so as to change a content of each of said interlocution windows of said first and second stations identically with each other.

5. A communication method carried out in a communication system including a plurality of stations connected to a communication network, each of said stations being loaded with a plurality of application programs and a control program and having a multi-window function for creating a plurality of windows on a display screen, said method comprising:

a step of creating control windows for working therein the control programs in display screens of first and second stations, respectively;

a step of establishing on said communication network a communication path for communicating between said first and second stations by supplying control commands to said control commands through said control window in a predetermined procedure;

a step of creating a first window for working therein an application program in the display screen of said first station and logically establishing on said communication path an interlocution path for logically connecting said first window in said first station and one of a plurality of windows created in the display screen of said second station for working therein an application program equivalent in function to the application program working in said first window, said creation of said first window and establishment of said interlocution path being accomplished in response to command input operations carried out through said control window at said first station;

a step of creating a second window for working therein an application program in the display screen of said first station without establishing on said communication path an interlocution path for logically connecting the second window with any one of windows created in the display screen of said second station;

a step of inputting data or a command to one of said first and second windows in the display screen at said first station;

a step of intercepting said input data or command by said control program at said first station and supplying said intercepted input data or command to either one of said application programs corresponding to one of said first and second windows to which said data or command has been inputted;

a step of checking by said control program at said first station whether or not said intercepted input data or command has been inputted to a window for which an interlocution path has been established;

a step of sending said intercepted input data or command from said first station to said second station through said communication path using said interlocution path by said control program at said first station if it was detected in said checking step that the interlocution path exists; and a step of supplying, by said communication control program at said second station, said data command received from said communication path to said application program running in the window logically connected to said first window by said interlocution path, thereby to display to the window the same output as that of said first window as a result of data processing performed by the application program.

6. A communication system for carrying out interlocution through a plurality of stations each having a display screen and being connected to a communication network, each of said stations comprising:

means for creating a plurality of windows each for running an application program therein and a control window for inputting control commands for interlocution control in a display screen;

means for inputting data or commands to any one of said windows created in the display screen;

interface means for establishing a communication path between the station and selected one of the other stations through said communication network; and interlocution control means responsive to control commands inputted through the control window created in the display screen, for controlling said communication path in cooperation with said interface means, for logically establishing on said communication path an interlocution path for interlocking one of a plurality of windows created in the display screen of the station and one of a plurality of windows created in the display screen of said one of the other stations in response to a first command inputted through said control window, and for releasing an interlocution path established on the communication path in response to a second command inputted through said control window;

said interlocution control means having means for checking when data or a command is inputted to one of windows by a user with said input means whether or not an interlocution path exists in relation to said one window of application programs running on said one and for transmitting said input data or command to one of the other stations through said communication path using said interlocution path, when the interlocution path exists, means for receiving data or a command generated at one of the other stations from said communication path, and means for selectively distributing said data or command received from said input means and said data or command received from said communication path to one of said application programs.

7. A communication system according to claim 6, wherein said interlocution control means includes means for transmitting a control signal corresponding to said first or second command to said communication path when said first or second command is inputted through said control window by using said inputting means by a user of the station.

8. A communication system according to claim 6, wherein said interlocution control means further comprises means for creating in one of windows for running an application program therein a plurality of pointing objects assigned to respective users participating to an interlocution and for moving the location of said pointing objects on the display screen in response to control commands for controlling pointing objects received from said input means or said communication path.

9. A communication system for use in interlocution through a plurality of remote stations each having a display screen and being connected to a communication network, each of said station comprising:

means for creating a plurality of windows on the display screen;

means for inputting data or commands to any one of windows created on the display screen;

interface means for establishing a communication path for communicating between the station and one of the other stations through said communication network; and interlocution control means for logically forming on said communication path an interlocution path for coordinating one of said windows created in the display screen of the station and one of said windows created in the display screen of said one of the other stations in response to a first command, and for releasing an interlocution path established on the communication path in response to a second command;

said interlocution control means including means for intercepting data or a command inputted to any one of windows by a user with said input means, means for checking whether or not an interlocution path exists in relation to said one window to which said data or command was inputted and for transmitting said intercepted input data or command to said communication path through said interface means if the interlocution path exists, and means for receiving data or a command generated at said one of the other stations through said interface means and said communication path and for selectively supplying said intercepted data or command inputted from said input means and said data or command received from said interface means to one of said application programs running in the windows.

* * * * *